US010848276B2

(12) United States Patent
Hosseini et al.

(10) Patent No.: US 10,848,276 B2
(45) Date of Patent: Nov. 24, 2020

(54) CARRIER AGGREGATION FOR DOWNLINK THROUGHPUT ENHANCEMENT IN SHORTENED TRANSMISSION TIME INTERVAL OPERATION

(71) Applicant: QUALCOMM Incorporated, San Diego, CA (US)

(72) Inventors: Seyedkianoush Hosseini, San Diego, CA (US); Amir Farajidana, Sunnyvale, CA (US); Brian Clarke Banister, San Diego, CA (US)

(73) Assignee: Qualcomm Incorporated, San Diego, CA (US)

( * ) Notice: Subject to any disclaimer, the term of this patent is extended or adjusted under 35 U.S.C. 154(b) by 36 days.

(21) Appl. No.: 16/226,465

(22) Filed: Dec. 19, 2018

(65) Prior Publication Data

US 2019/0199481 A1    Jun. 27, 2019

Related U.S. Application Data

(60) Provisional application No. 62/609,207, filed on Dec. 21, 2017.

(51) Int. Cl.
*H04L 1/16* (2006.01)
*H04L 1/18* (2006.01)
(Continued)

(52) U.S. Cl.
CPC ........ *H04L 1/1685* (2013.01); *H04J 11/0069* (2013.01); *H04L 1/0038* (2013.01);
(Continued)

(58) Field of Classification Search
CPC .................................................. H04L 1/1685
(Continued)

(56) References Cited

U.S. PATENT DOCUMENTS

2018/0192420 A1\* 7/2018 Hao ................. H04W 72/0446
2018/0242316 A1    8/2018 Takeda et al.
(Continued)

FOREIGN PATENT DOCUMENTS

WO    WO-2017033839 A1    3/2017

OTHER PUBLICATIONS

International Search Report and Written Opinion—PCT/US2018/066928—ISA/EPO—dated Apr. 5, 2019.
(Continued)

*Primary Examiner* — Peter G Solinsky
(74) *Attorney, Agent, or Firm* — Holland & Hart LLP

(57) ABSTRACT

Methods, systems, and devices for wireless communications are described. In some wireless communications systems, devices may implement carrier aggregation and shortened transmission time intervals (sTTIs) for downlink transmissions. To improve downlink throughput with a reduced feedback latency, the system may implement a modified hybrid automatic repeat request (HARQ) timeline. For example, a base station may configure a first component carrier with a TTI or sTTI for downlink that is longer than an sTTI for a second uplink component carrier. The base station and a user equipment (UE) may operate using a HARQ timing for the first component carrier that is based on the shorter sTTI for the second component carrier. The base station may transmit a downlink transmission using the longer TTI or sTTI for greater carrier aggregation, and the UE may send a downlink HARQ acknowledgment (ACK) message in response according to the HARQ timing for reduced latency.

64 Claims, 16 Drawing Sheets

(51) Int. Cl.
*H04L 1/00* (2006.01)
*H04W 56/00* (2009.01)
*H04J 11/00* (2006.01)
*H04L 5/00* (2006.01)
*H04L 5/14* (2006.01)

(52) U.S. Cl.
CPC .......... *H04L 1/1812* (2013.01); *H04L 1/1822* (2013.01); *H04L 1/1854* (2013.01); *H04L 1/1887* (2013.01); *H04W 56/0045* (2013.01); *H04L 5/001* (2013.01); *H04L 5/14* (2013.01)

(58) Field of Classification Search
USPC .......................................................... 370/329
See application file for complete search history.

(56) References Cited

U.S. PATENT DOCUMENTS

| | | | | |
|---|---|---|---|---|
| 2019/0305914 | A1* | 10/2019 | Lee | H04W 24/08 |
| 2020/0068537 | A1* | 2/2020 | Oh | H04W 72/1278 |
| 2020/0068557 | A1* | 2/2020 | Lee | H04L 5/00 |
| 2020/0077349 | A1* | 3/2020 | Chae | H04W 72/005 |
| 2020/0077429 | A1* | 3/2020 | Ma | H04W 72/04 |
| 2020/0120668 | A1* | 4/2020 | Lee | H04L 1/18 |
| 2020/0221472 | A1* | 7/2020 | Schober | H04W 72/1252 |

OTHER PUBLICATIONS

LG Electronics: "Support of Cross-CC DCI/UCI Transmission for NR CA", 3GPP Draft; R1-1710339 NR-CA_FINAL, 3rd Generation Partnership Project (3GPP), Mobile Competence Centre; 650, Route Des Lucioles; F-06921 Sophia-Antipolis Cedex; France, vol. RAN WG1, No. Qingdao, P.R. China; Jun. 27, 2017-Jun. 30, 2017 Jun. 26, 2017, XP051299554, Retrieved from the Internet: URL:http://www.3gpp.org/ftp/Meetings_3GPP_SYNC/RAN1/Docs/ [retrieved on Jun. 26, 2017], 7 pages.

Mediatek Inc: "Discussions on the Structure of STTI", 3GPP Draft; R1-1612749 Discussions on the Structure of STTI, 3rd Generation Partnership Project (3GPP), Mobile Competence Centre; 650, Route Des Lucioles; F-06921 Sophia-Antipolis Cedex; France, vol. RAN WG1, No. Reno, USA; Nov. 14, 2016-Nov. 18, 2016 Nov. 13, 2016, XP051176691, Retrieved from the Internet: URL:http://www.3gpp.org/ftp/Meetings_3GPP_SYNC/RAN1/Docs/ [retrieved on Nov. 13, 2016], 4 pages.

NTT Docomo Inc: "Views on Processing Time Reduction and Related Procedures", 3GPP Draft; R1-1612698, 3rd Generation Partnership Project (3GPP), Mobile Competence Centre; 650, Route Des Lucioles; F-06921 Sophia-Antipolis Cedex; France, vol. RAN WG1, No. Reno, USA; Nov. 14, 2016-Nov. 18, 2016 Nov. 13, 2016 (Nov. 13, 2016), XP051176641, Retrieved from the Internet: URL:http://www.3gpp.org/ftp/Meetings_3GPP_SYNC/RAN1/Docs/ [retrieved on Nov. 13, 2016], 8 pages.

Huawei, et al., "Discussion on CA Issues for Shortened TTI Operation", 3GPP Draft; R1-1611193, 3rd Generation Partnership Project (3GPP), Mobile Competence Centre; 650, Route Des Lucioles; F-06921 Sophia-Antipolis Cedex; France, vol. RAN WG1, No. Reno, USA; Nov. 14, 2016-Nov. 18, 2016, Nov. 13, 2016 (Nov. 13, 2016), 4 Pages, XP051175174, Retrieved from the Internet: URL: http://www.3gpp.org/ftp/Meetings_3GPP_SYNC/RAN1/Docs/ [retrieved on Nov. 13, 2016].

\* cited by examiner

CARRIER AGGREGATION FOR DOWNLINK THROUGHPUT ENHANCEMENT IN SHORTENED TRANSMISSION TIME INTERVAL OPERATION

CROSS REFERENCES

The present Application for Patent claims the benefit of U.S. Provisional Patent Application No. 62/609,207 by Hosseini et al., entitled "CARRIER AGGREGATION FOR DOWNLINK THROUGHPUT ENHANCEMENT IN SHORTENED TRANSMISSION TIME INTERVAL (STTI) OPERATION," filed Dec. 21, 2017, assigned to the assignee hereof, and expressly incorporated herein.

BACKGROUND

The following relates generally to wireless communication, and more specifically to carrier aggregation for downlink throughput enhancement in shortened transmission time interval (sTTI) operation.

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform-spread-OFDM (DFT-S-OFDM). A wireless multiple-access communications system may include a number of base stations or network access nodes, each simultaneously supporting communication for multiple communication devices, which may be otherwise known as user equipment (UE).

In some wireless communications systems, wireless devices such as base stations and UEs may utilize carrier aggregation and sTTIs for efficiently transmitting downlink messages. However, the number of component carriers supported for carrier aggregation may depend on the transmission mode implemented by the wireless device. Accordingly, implementing a transmission mode that supports more component carriers may require longer sTTIs, resulting in a tradeoff between downlink throughput and response latency.

SUMMARY

The described techniques relate to improved methods, systems, devices, or apparatuses that support carrier aggregation for downlink throughput enhancement in shortened transmission time interval (sTTI) operation. Generally, the described techniques provide for improved downlink throughput with reduced hybrid automatic repeat request (HARQ) feedback latency in wireless communications systems. For example, base stations and user equipment (UEs) in some wireless communications systems may implement modified HARQ timelines. For a physical uplink control channel (PUCCH) group, a base station may configure a first component carrier (e.g., a primary cell (PCell) or PUCCH secondary cell (PSCell) component carrier) with a first transmission time interval (TTI) or sTTI for downlink. The base station may additionally configure a second component carrier (e.g., in the same PUCCH group as the first PCell or PSCell component carrier) for uplink with a second sTTI that is shorter than the first TTI or sTTI. The base station and UEs may identify a HARQ timing associated with downlink transmissions that is based on the second sTTI (e.g., the sTTI for uplink) rather than the first TTI or sTTI (e.g., the TTI or sTTI for downlink). When the base station transmits a downlink transmission over the first component carrier, the UE may receive the downlink transmission and may send a downlink HARQ positive or negative acknowledgment (ACK/NACK) message in response according to the identified HARQ timing. In some cases, the HARQ timing may further be based on one or more capabilities, configurations, or limitations of the UE.

A method of wireless communication is described. The method may include identifying a HARQ timing for a first component carrier configured with a first TTI or sTTI and associated with downlink transmissions, the HARQ timing for the first component carrier based at least in part on a second sTTI configured for a second component carrier associated with uplink transmissions, where the second sTTI is shorter than the first TTI or sTTI. The method may further include receiving a downlink transmission over the first component carrier using the first TTI or sTTI and transmitting a downlink HARQ ACK/NACK message corresponding to the downlink transmission according to the identified HARQ timing.

An apparatus for wireless communication is described. The apparatus may include means for identifying a HARQ timing for a first component carrier configured with a first TTI or sTTI and associated with downlink transmissions, the HARQ timing for the first component carrier based at least in part on a second sTTI configured for a second component carrier associated with uplink transmissions, where the second sTTI is shorter than the first TTI or sTTI. The apparatus may further include means for receiving a downlink transmission over the first component carrier using the first TTI or sTTI and means for transmitting a downlink HARQ ACK/NACK message corresponding to the downlink transmission according to the identified HARQ timing.

Another apparatus for wireless communication is described. The apparatus may include a processor, memory in electronic communication with the processor, and instructions stored in the memory. The instructions may be operable to cause the processor to identify a HARQ timing for a first component carrier configured with a first TTI or sTTI and associated with downlink transmissions, the HARQ timing for the first component carrier based at least in part on a second sTTI configured for a second component carrier associated with uplink transmissions, where the second sTTI is shorter than the first TTI or sTTI. The instructions may be further operable to cause the processor to receive a downlink transmission over the first component carrier using the first TTI or sTTI and transmit a downlink HARQ ACK/NACK message corresponding to the downlink transmission according to the identified HARQ timing.

A non-transitory computer-readable medium for wireless communication is described. The non-transitory computer-readable medium may include instructions operable to cause a processor to identify a HARQ timing for a first component carrier configured with a first TTI or sTTI and associated with downlink transmissions, the HARQ timing for the first component carrier based at least in part on a second sTTI configured for a second component carrier associated with uplink transmissions, where the second sTTI is shorter than the first TTI or sTTI. The instructions may be further operable to cause the processor to receive a downlink transmission over the first component carrier using the first TTI or sTTI and transmit a downlink HARQ ACK/NACK message corresponding to the downlink transmission according to the identified HARQ timing.

In some examples of the method, apparatus, and non-transitory computer-readable medium described above, identifying the HARQ timing for the first component carrier may include receiving an indication of the HARQ timing over the first component carrier.

Some examples of the method, apparatus, and non-transitory computer-readable medium described above may further include processes, features, means, or instructions for transmitting an indication of one or more UE capabilities, where the HARQ timing may be further based at least in part on the one or more UE capabilities. In some examples of the method, apparatus, and non-transitory computer-readable medium described above, the one or more UE capabilities include a transport block size (TBS), a number of layers, a reference signal type, a physical downlink control channel (PDCCH) transmission duration, an sTTI PDCCH transmission duration, a number of blind decodes, a search space size for the PDCCH or the sTTI PDCCH, or a combination thereof.

In some examples of the method, apparatus, and non-transitory computer-readable medium described above, the one or more UE capabilities may correspond to a UE transmitting the downlink HARQ ACK/NACK message. Some examples of the method, apparatus, and non-transitory computer-readable medium described above may further include processes, features, means, or instructions for determining a number of component carriers configured with the first TTI or sTTI, a total number of component carriers configured for the UE, or a combination thereof, where the indication of the one or more UE capabilities is based at least in part on the number of component carriers configured with the first TTI or sTTI, the total number of component carriers configured for the UE, or the combination thereof.

Some examples of the method, apparatus, and non-transitory computer-readable medium described above may further include processes, features, means, or instructions for determining a maximum timing advance (TA) based at least in part on the second sTTI, the one or more UE capabilities, or a combination thereof.

In some examples of the method, apparatus, and non-transitory computer-readable medium described above, the downlink HARQ ACK/NACK message may be transmitted over the second component carrier using the second sTTI.

In some examples of the method, apparatus, and non-transitory computer-readable medium described above, the first component carrier and the second component carrier correspond to a same PUCCH group.

In some examples of the method, apparatus, and non-transitory computer-readable medium described above, the first component carrier may be configured in a time division duplex (TDD) mode, a licensed assisted access (LAA) mode, an enhanced LAA (eLAA) mode, or a combination thereof. In some examples of the method, apparatus, and non-transitory computer-readable medium described above, the first component carrier or the second component carrier may be configured in a frequency division duplex (FDD) mode.

In some examples of the method, apparatus, and non-transitory computer-readable medium described above, the first TTI or sTTI is an example of an sTTI spanning seven orthogonal frequency division multiplexing (OFDM) symbols. In some examples of the method, apparatus, and non-transitory computer-readable medium described above, the first TTI or sTTI is an example of a TTI spanning fourteen OFDM symbols. In some examples of the method, apparatus, and non-transitory computer-readable medium described above, the TTI may be split into two slots, and the downlink transmission may be received over each of the two slots. In some examples of the method, apparatus, and non-transitory computer-readable medium described above, the second sTTI spans two or three OFDM symbols.

In some examples of the method, apparatus, and non-transitory computer-readable medium described above, the first component carrier is an example of a secondary cell (SCell) component carrier. In some examples of the method, apparatus, and non-transitory computer-readable medium described above, the second component carrier is an example of a PCell component carrier or a PSCell component carrier.

A method of wireless communication is described. The method may include configuring a first component carrier with a first TTI or sTTI for downlink transmissions and a second component carrier with a second sTTI for uplink transmissions, where the second sTTI is shorter than the first TTI or sTTI. The method may further include identifying a HARQ timing for the first component carrier and associated with downlink transmissions based at least in part on the second sTTI configured for the second component carrier, performing a downlink transmission over the first component carrier using the first TTI or sTTI, and receiving a downlink HARQ ACK/NACK message corresponding to the downlink transmission according to the identified HARQ timing.

An apparatus for wireless communication is described. The apparatus may include means for configuring a first component carrier with a first TTI or sTTI for downlink transmissions and a second component carrier with a second sTTI for uplink transmissions, where the second sTTI is shorter than the first TTI or sTTI. The apparatus may further include means for identifying a HARQ timing for the first component carrier and associated with downlink transmissions based at least in part on the second sTTI configured for the second component carrier, means for performing a downlink transmission over the first component carrier using the first TTI or sTTI, and means for receiving a downlink HARQ ACK/NACK message corresponding to the downlink transmission according to the identified HARQ timing.

Another apparatus for wireless communication is described. The apparatus may include a processor, memory in electronic communication with the processor, and instructions stored in the memory. The instructions may be operable to cause the processor to configure a first component carrier with a first TTI or sTTI for downlink transmissions and a second component carrier with a second sTTI for uplink transmissions, where the second sTTI is shorter than the first TTI or sTTI. The instructions may be further operable to cause the processor to identify a HARQ timing for the first component carrier and associated with downlink transmissions based at least in part on the second sTTI configured for the second component carrier, perform a downlink transmission over the first component carrier using the first TTI or sTTI, and receive a downlink HARQ ACK/NACK message corresponding to the downlink transmission according to the identified HARQ timing.

A non-transitory computer-readable medium for wireless communication is described. The non-transitory computer-readable medium may include instructions operable to cause a processor to configure a first component carrier with a first TTI or sTTI for downlink transmissions and a second component carrier with a second sTTI for uplink transmissions, where the second sTTI is shorter than the first TTI or sTTI. The instructions may be further operable to cause the processor to identify a HARQ timing for the first component carrier and associated with downlink transmissions based at least in part on the second sTTI configured for the second component carrier, perform a downlink transmission over the first component carrier using the first TTI or sTTI, and receive a downlink HARQ ACK/NACK message corresponding to the downlink transmission according to the identified HARQ timing.

Some examples of the method, apparatus, and non-transitory computer-readable medium described above may further include processes, features, means, or instructions for transmitting an indication of the HARQ timing over the first component carrier.

Some examples of the method, apparatus, and non-transitory computer-readable medium described above may further include processes, features, means, or instructions for identifying one or more UE capabilities, where identifying the HARQ timing may be further based at least in part on the one or more UE capabilities. In some examples of the method, apparatus, and non-transitory computer-readable medium described above, the one or more UE capabilities include a TBS, a number of layers, a reference signal type, a PDCCH transmission duration (e.g., a "legacy" PDCCH transmission duration), an sTTI PDCCH transmission duration, a number of blind decodes, a search space size for the PDCCH or the sTTI PDCCH, or a combination thereof. In some examples of the method, apparatus, and non-transitory computer-readable medium described above, identifying the one or more UE capabilities includes receiving an indication of the one or more UE capabilities.

In some examples of the method, apparatus, and non-transitory computer-readable medium described above, the one or more UE capabilities may correspond to a UE transmitting the downlink HARQ ACK/NACK message and the one or more UE capabilities may be based on a number of component carriers configured with the first TTI or sTTI, a total number of component carriers configured for the UE, or a combination thereof.

In some examples of the method, apparatus, and non-transitory computer-readable medium described above, the downlink HARQ ACK/NACK message may be received over the second component carrier using the second sTTI.

In some examples of the method, apparatus, and non-transitory computer-readable medium described above, the first component carrier and the second component carrier correspond to a same PUCCH group.

Some examples of the method, apparatus, and non-transitory computer-readable medium described above may further include processes, features, means, or instructions for configuring the first component carrier in a TDD mode, an LAA mode, an eLAA mode, or a combination thereof. Some examples of the method, apparatus, and non-transitory computer-readable medium described above may further include processes, features, means, or instructions for configuring the first component carrier or the second component carrier in an FDD mode.

In some examples of the method, apparatus, and non-transitory computer-readable medium described above, the first TTI or sTTI is an example of an sTTI spanning seven OFDM symbols. In some examples of the method, apparatus, and non-transitory computer-readable medium described above, the first TTI or sTTI is an example of a TTI spanning fourteen OFDM symbols. Some examples of the method, apparatus, and non-transitory computer-readable medium described above may further include processes, features, means, or instructions for splitting the TTI into two slots, where the downlink transmission may be performed over each of the two slots. In some examples of the method, apparatus, and non-transitory computer-readable medium described above, the second sTTI spans two or three OFDM symbols.

In some examples of the method, apparatus, and non-transitory computer-readable medium described above, the first component carrier is an example of an SCell component carrier. In some examples of the method, apparatus, and non-transitory computer-readable medium described above, the second component carrier is an example of a PCell component carrier or a PSCell component carrier.

DETAILED DESCRIPTION

Figure 1:
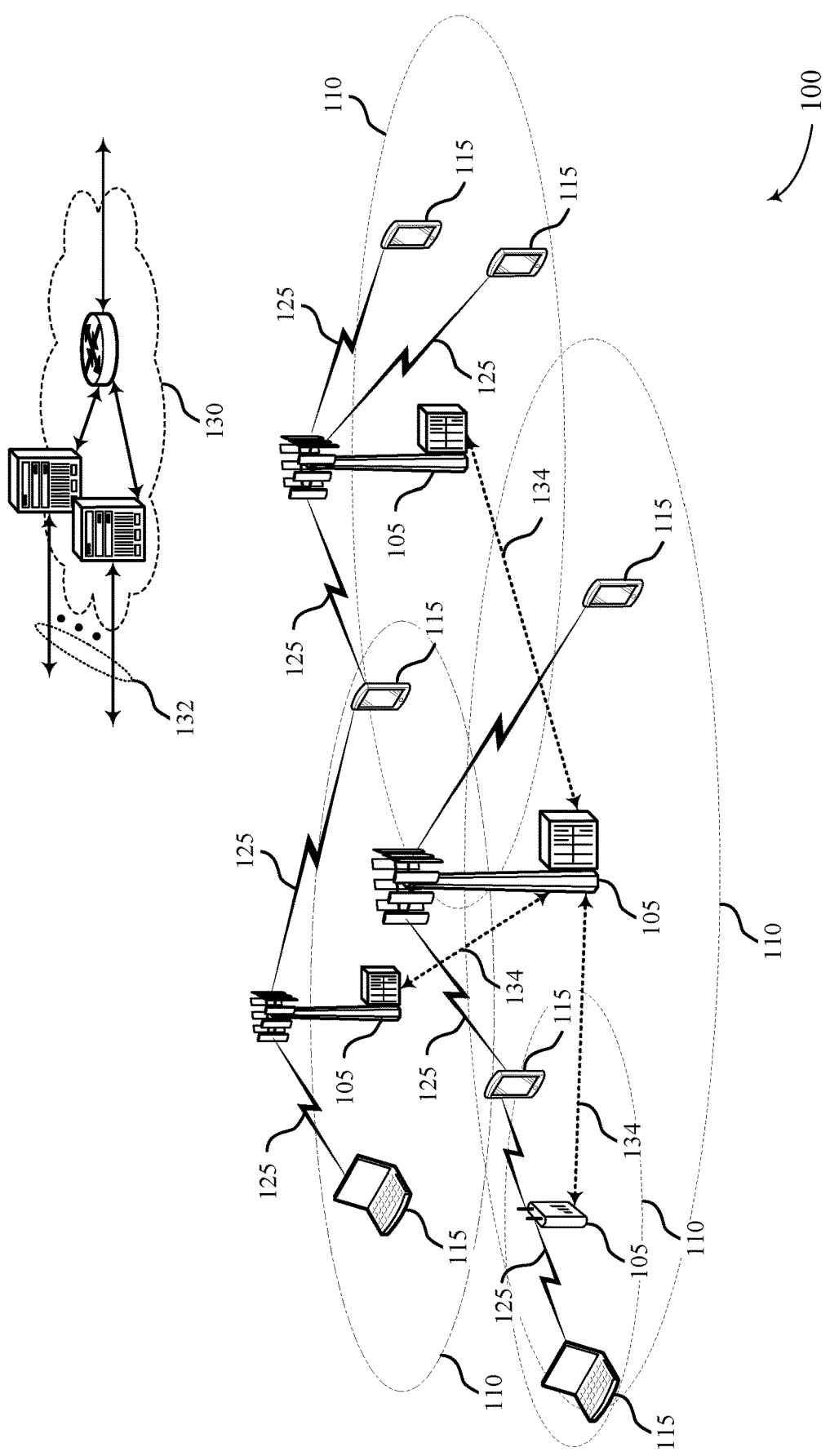
FIGS. 1 and 2 illustrate examples of wireless communications systems that support carrier aggregation for downlink throughput enhancement in shortened transmission time interval (sTTI) operation in accordance with aspects of the present disclosure.

In some wireless communications systems, base stations and user equipment (UEs) may implement carrier aggregation in combination with shortened transmission time intervals (sTTIs). The wireless devices may utilize component carriers with different modes of operation. For example, a base station may transmit on the downlink using a time division duplex (TDD) mode, a licensed assisted access (LAA) mode, an enhanced LAA (eLAA) mode, or some combination of these modes or other similar modes. These modes of operation may support a greater number of component carriers for carrier aggregation than a frequency division duplex (FDD) mode. However, a UE may transmit on the uplink using the FDD mode, as the FDD mode may be compatible with shorter sTTIs than the other modes of operation. For example, an FDD component carrier may support frame structure (FS) 1 and sTTIs that are two orthogonal frequency division multiplexing (OFDM) symbols in length. In contrast, TDD component carriers may support FS2 and sTTIs seven OFDM symbols in length, and LAA or eLAA component carriers may support FS3 and transmission time intervals (TTIs) fourteen OFDM symbols in length.

To support enhanced downlink throughput with reduced hybrid automatic repeat request (HARQ) latency, the base station and UE may implement a modified HARQ timeline. The base station and UE may identify a HARQ timing associated with downlink transmissions that is based on the sTTI for uplink, as opposed to being based on the TTI or sTTI for downlink. The base station may send a downlink transmission to the UE on the FS2 or FS3 component carrier (e.g., using a seven or fourteen symbol sTTI or TTI and a secondary cell (SCell) component carrier). The UE may receive the downlink transmission and may send a downlink HARQ positive or negative acknowledgment (ACK/NACK) message in response to the downlink transmission. For example, the UE may perform a HARQ process to determine whether to send an ACK or NACK, and may send the downlink HARQ ACK/NACK on the FS1 component carrier for uplink (e.g., using a two or three symbol sTTI and a primary cell (PCell) or physical uplink control channel (PUCCH) secondary cell (PSCell) component carrier). The UE may send the downlink HARQ ACK/NACK to the base station according to the identified HARQ timing. In this way, the base station may utilize longer TTIs or sTTIs for downlink transmissions, supporting increased carrier aggregation, while the UE may send HARQ feedback according to a faster timeframe based on shorter sTTIs, supporting reduced HARQ latency.

Aspects of the disclosure are initially described in the context of wireless communications systems. Additional aspects of the disclosure are described with respect to downlink HARQ timing and a process flow. Aspects of the disclosure are further illustrated by and described with reference to apparatus diagrams, system diagrams, and flowcharts that relate to carrier aggregation for downlink throughput enhancement in sTTI operation.

FIG. 1 illustrates an example of a wireless communications system 100 that supports carrier aggregation for downlink throughput enhancement in sTTI operation in accordance with aspects of the present disclosure. The wireless communications system 100 includes base stations 105, UEs 115, and a core network 130. In some examples, the wireless communications system 100 may be a Long Term Evolution (LTE) network, an LTE-Advanced (LTE-A) network, an LTE-A Pro network, or a New Radio (NR) network. In some cases, wireless communications system 100 may support enhanced broadband communications, ultra-reliable (e.g., mission critical) communications, low latency communications, or communications with low-cost and low-complexity devices. In some cases, the base stations 105 and UEs 115 may operate within a wireless communications system 100 supporting carrier aggregation and sTTI operations.

Base stations 105 may wirelessly communicate with UEs 115 via one or more base station antennas. Base stations 105 described herein may include or may be referred to by those skilled in the art as a base transceiver station, a radio base station, an access point, a radio transceiver, a NodeB, an eNodeB (eNB), a next-generation Node B or giga-nodeB (either of which may be referred to as a gNB), a Home NodeB, a Home eNodeB, or some other suitable terminology. Wireless communications system 100 may include base stations 105 of different types (e.g., macro or small cell base stations). The UEs 115 described herein may be able to communicate with various types of base stations 105 and network equipment including macro eNBs, small cell eNBs, gNBs, relay base stations, and the like.

Each base station 105 may be associated with a particular geographic coverage area 110 in which communications with various UEs 115 is supported. Each base station 105 may provide communication coverage for a respective geographic coverage area 110 via communication links 125, and communication links 125 between a base station 105 and a UE 115 may utilize one or more carriers. Communication links 125 shown in wireless communications system 100 may include uplink transmissions from a UE 115 to a base station 105, or downlink transmissions from a base station 105 to a UE 115. Downlink transmissions may also be called forward link transmissions while uplink transmissions may also be called reverse link transmissions.

The geographic coverage area 110 for a base station 105 may be divided into sectors making up only a portion of the geographic coverage area 110, and each sector may be associated with a cell. For example, each base station 105 may provide communication coverage for a macro cell, a small cell, a hot spot, or other types of cells, or various combinations thereof. In some examples, a base station 105 may be movable and therefore provide communication coverage for a moving geographic coverage area 110. In some examples, different geographic coverage areas 110 associated with different technologies may overlap, and overlapping geographic coverage areas 110 associated with different technologies may be supported by the same base station 105 or by different base stations 105. The wireless communications system 100 may include, for example, a heterogeneous LTE/LTE-A/LTE-A Pro or NR network in which different types of base stations 105 provide coverage for various geographic coverage areas 110.

The term "cell" refers to a logical communication entity used for communication with a base station 105 (e.g., over a carrier), and may be associated with an identifier for distinguishing neighboring cells (e.g., a physical cell identifier (PCID), a virtual cell identifier (VCID)) operating via the same or a different carrier. In some examples, a carrier may support multiple cells, and different cells may be configured according to different protocol types (e.g., machine-type communication (MTC), narrowband Internet-of-Things (NB-IoT), enhanced mobile broadband (eMBB), or others) that may provide access for different types of devices. In some cases, the term "cell" may refer to a portion of a geographic coverage area 110 (e.g., a sector) over which the logical entity operates.

UEs 115 may be dispersed throughout the wireless communications system 100, and each UE 115 may be stationary or mobile. A UE 115 may also be referred to as a mobile device, a wireless device, a remote device, a handheld device, or a subscriber device, or some other suitable terminology, where the "device" may also be referred to as a unit, a station, a terminal, or a client. A UE 115 may also be a personal electronic device such as a cellular phone, a personal digital assistant (PDA), a tablet computer, a laptop computer, or a personal computer. In some examples, a UE 115 may also refer to a wireless local loop (WLL) station, an Internet of Things (IoT) device, an Internet of Everything (IoE) device, or an MTC device, or the like, which may be implemented in various articles such as appliances, vehicles, meters, or the like.

Some UEs 115, such as MTC or IoT devices, may be low cost or low complexity devices, and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay that information to a central server or application program that can make use of the information or present the information to humans interacting with the program or application. Some UEs 115 may be designed to collect information or enable automated behavior of machines. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples half-duplex communications may be performed at a reduced peak rate. Other power conservation techniques for UEs 115 include entering a power saving "deep sleep" mode when not engaging in active communications, or operating over a limited bandwidth (e.g., according to narrowband communications). In some cases, UEs 115 may be designed to support critical functions (e.g., mission critical functions), and a wireless communications system 100 may be configured to provide ultra-reliable communications for these functions.

In some cases, a UE 115 may also be able to communicate directly with other UEs 115 (e.g., using a peer-to-peer (P2P) or device-to-device (D2D) protocol). One or more of a group of UEs 115 utilizing D2D communications may be within the geographic coverage area 110 of a base station 105. Other UEs 115 in such a group may be outside the geographic coverage area 110 of a base station 105, or be otherwise unable to receive transmissions from a base station 105. In some cases, groups of UEs 115 communicating via D2D communications may utilize a one-to-many (1:M) system in which each UE 115 transmits to every other UE 115 in the group. In some cases, a base station 105 facilitates the scheduling of resources for D2D communications. In other cases, D2D communications are carried out between UEs 115 without the involvement of a base station 105.

Base stations 105 may communicate with the core network 130 and with one another. For example, base stations 105 may interface with the core network 130 through backhaul links 132 (e.g., via an S1 or other interface). Base stations 105 may communicate with one another over backhaul links 134 (e.g., via an X2 or other interface) either directly (e.g., directly between base stations 105) or indirectly (e.g., via core network 130).

The core network 130 may provide user authentication, access authorization, tracking, Internet Protocol (IP) connectivity, and other access, routing, or mobility functions. The core network 130 may be an evolved packet core (EPC), which may include at least one mobility management entity (MME), at least one serving gateway (S-GW), and at least one Packet Data Network (PDN) gateway (P-GW). The MME may manage non-access stratum (e.g., control plane) functions such as mobility, authentication, and bearer management for UEs 115 served by base stations 105 associated with the EPC. User IP packets may be transferred through the S-GW, which itself may be connected to the P-GW. The P-GW may provide IP address allocation as well as other functions. The P-GW may be connected to the network operators IP services. The operators IP services may include access to the Internet, Intranet(s), an IP Multimedia Subsystem (IMS), or a Packet-Switched (PS) Streaming Service.

At least some of the network devices, such as a base station 105, may include subcomponents such as an access network entity, which may be an example of an access node controller (ANC). Each access network entity may communicate with UEs 115 through a number of other access network transmission entities, which may be referred to as a radio head, a smart radio head, or a transmission/reception point (TRP). In some configurations, various functions of each access network entity or base station 105 may be distributed across various network devices (e.g., radio heads and access network controllers) or consolidated into a single network device (e.g., a base station 105).

Wireless communications system 100 may operate using one or more frequency bands, typically in the range of 300 MHz to 300 GHz. Generally, the region from 300 MHz to 3 GHz is known as the ultra-high frequency (UHF) region or decimeter band, since the wavelengths range from approximately one decimeter to one meter in length. UHF waves may be blocked or redirected by buildings and environmental features. However, the waves may penetrate structures sufficiently for a macro cell to provide service to UEs 115 located indoors. Transmission of UHF waves may be associated with smaller antennas and shorter range (e.g., less than 100 km) compared to transmission using the smaller frequencies and longer waves of the high frequency (HF) or very high frequency (VHF) portion of the spectrum below 300 MHz.

Wireless communications system 100 may also operate in a super high frequency (SHF) region using frequency bands from 3 GHz to 30 GHz, also known as the centimeter band. The SHF region includes bands such as the 5 GHz industrial, scientific, and medical (ISM) bands, which may be used opportunistically by devices that can tolerate interference from other users.

Wireless communications system 100 may also operate in an extremely high frequency (EHF) region of the spectrum (e.g., from 30 GHz to 300 GHz), also known as the millimeter band. In some examples, wireless communications system 100 may support millimeter wave (mmW) communications between UEs 115 and base stations 105, and EHF antennas of the respective devices may be even smaller and more closely spaced than UHF antennas. In some cases, this may facilitate use of antenna arrays within a UE 115. However, the propagation of EHF transmissions may be subject to even greater atmospheric attenuation and shorter range than SHF or UHF transmissions. Techniques disclosed herein may be employed across transmissions that use one or more different frequency regions, and designated use of bands across these frequency regions may differ by country or regulating body.

In some cases, wireless communications system 100 may utilize both licensed and unlicensed radio frequency spectrum bands. For example, wireless communications system 100 may employ Licensed Assisted Access (LAA), LTE-Unlicensed (LTE-U) radio access technology, or NR technology in an unlicensed band such as the 5 GHz ISM band. When operating in unlicensed radio frequency spectrum bands, wireless devices such as base stations 105 and UEs 115 may employ listen-before-talk (LBT) procedures to ensure a frequency channel is clear before transmitting data. In some cases, operations in unlicensed bands may be based on a carrier aggregation configuration in conjunction with component carriers operating in a licensed band (e.g., LAA). Operations in unlicensed spectrum may include downlink transmissions, uplink transmissions, peer-to-peer transmissions, or a combination of these. Duplexing in unlicensed spectrum may be based on FDD, TDD, or a combination of both.

In some examples, a base station 105 or UE 115 may be equipped with multiple antennas, which may be used to employ techniques such as transmit diversity, receive diversity, multiple-input multiple-output (MIMO) communications, or beamforming. For example, wireless communications system 100 may use a transmission scheme between a transmitting device (e.g., a base station 105) and a receiving device (e.g., a UE 115), where the transmitting device is equipped with multiple antennas and the receiving devices are equipped with one or more antennas. MIMO communications may employ multipath signal propagation to increase the spectral efficiency by transmitting or receiving multiple signals via different spatial layers, which may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (e.g., the same codeword) or different data streams. Different spatial layers may be associated with different antenna ports used for channel measurement and reporting. MIMO techniques include single-user MIMO (SU-MIMO) where multiple spatial layers are transmitted to the same receiving device, and multiple-user MIMO (MU-MIMO) where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105 or a UE 115) to shape or steer an antenna beam (e.g., a transmit beam or receive beam) along a spatial path between the transmitting device and the receiving device. Beamforming may be achieved by combining the signals communicated via antenna elements of an antenna array such that signals propagating at particular orientations with respect to an antenna array experience constructive interference while others experience destructive interference. The adjustment of signals communicated via the antenna elements may include a transmitting device or a receiving device applying certain amplitude and phase offsets to signals carried via each of the antenna elements associated with the device. The adjustments associated with each of the antenna elements may be defined by a beamforming weight set associated with a particular orientation (e.g., with respect to the antenna array of the transmitting device or receiving device, or with respect to some other orientation).

In one example, a base station 105 may use multiple antennas or antenna arrays to conduct beamforming operations for directional communications with a UE 115. For instance, some signals (e.g. synchronization signals, reference signals, beam selection signals, or other control signals) may be transmitted by a base station 105 multiple times in different directions, which may include a signal being transmitted according to different beamforming weight sets associated with different directions of transmission. Transmissions in different beam directions may be used to identify (e.g., by the base station 105 or a receiving device, such as a UE 115) a beam direction for subsequent transmission and/or reception by the base station 105. Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based at least in part on a signal that was transmitted in different beam directions. For example, a UE 115 may receive one or more of the signals transmitted by the base station 105 in different directions, and the UE 115 may report to the base station 105 an indication of the signal it received with a highest signal quality, or an otherwise acceptable signal quality. Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115) or transmitting a signal in a single direction (e.g., for transmitting data to a receiving device).

A receiving device (e.g., a UE 115, which may be an example of a mmW receiving device) may try multiple receive beams when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets applied to signals received at a plurality of antenna elements of an antenna array, or by processing received signals according to different receive beamforming weight sets applied to signals received at a plurality of antenna elements of an antenna array, any of which may be referred to as "listening" according to different receive beams or receive directions. In some examples a receiving device may use a single receive beam to receive along a single beam direction (e.g., when receiving a data signal). The single receive beam may be aligned in a beam direction determined based at least in part on listening according to different receive beam directions (e.g., a beam direction determined to have a highest signal strength, highest signal-to-noise ratio, or otherwise acceptable signal quality based at least in part on listening according to multiple beam directions).

In some cases, the antennas of a base station 105 or UE 115 may be located within one or more antenna arrays, which may support MIMO operations, or transmit or receive beamforming. For example, one or more base station antennas or antenna arrays may be co-located at an antenna assembly, such as an antenna tower. In some cases, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations.

In some cases, wireless communications system 100 may be a packet-based network that operate according to a layered protocol stack. In the user plane, communications at the bearer or Packet Data Convergence Protocol (PDCP) layer may be IP-based. A Radio Link Control (RLC) layer may in some cases perform packet segmentation and reassembly to communicate over logical channels. A Medium Access Control (MAC) layer may perform priority handling and multiplexing of logical channels into transport channels. The MAC layer may also use HARQ to provide retransmission at the MAC layer to improve link efficiency. In the control plane, the Radio Resource Control (RRC) protocol layer may provide establishment, configuration, and maintenance of an RRC connection between a UE 115 and a base station 105 or core network 130 supporting radio bearers for user plane data. At the Physical (PHY) layer, transport channels may be mapped to physical channels.

In some cases, UEs 115 and base stations 105 may support retransmissions of data to increase the likelihood that data is received successfully. HARQ feedback is one technique of increasing the likelihood that data is received correctly over a communication link 125. HARQ may include a combination of error detection (e.g., using a cyclic redundancy check (CRC)), forward error correction (FEC), and retransmission (e.g., using an automatic repeat request (ARQ)). HARQ may improve throughput at the MAC layer in poor radio conditions (e.g., signal-to-noise conditions). In some cases, a wireless device may support same-slot HARQ feedback, where the device may provide HARQ feedback in a specific slot for data received in a previous symbol in the slot. In other cases, the device may provide HARQ feedback in a subsequent slot, or according to some other time interval.

Time intervals in LTE or NR may be expressed in multiples of a basic time unit, which may, for example, refer to a sampling period of $T_s=1/30,720,000$ seconds. Time intervals of a communications resource may be organized according to radio frames each having a duration of 10 milliseconds (ms), where the frame period may be expressed as $T_f=307,200\ T_s$. The radio frames may be identified by a system frame number (SFN) ranging from 0 to 1023. Each frame may include 10 subframes numbered from 0 to 9, and each subframe may have a duration of 1 ms. A subframe may be further divided into 2 slots each having a duration of 0.5 ms, and each slot may contain 6 or 7 modulation symbol periods (e.g., depending on the length of the cyclic prefix prepended to each symbol period). Excluding the cyclic prefix, each symbol period may contain 2048 sampling periods. In some cases a subframe may be the smallest scheduling unit of the wireless communications system 100, and may be referred to as a TTI. In other cases, a smallest scheduling unit of the wireless communications system 100 may be shorter than a subframe or may be dynamically selected (e.g., in bursts of sTTIs or in selected component carriers using sTTIs).

In some wireless communications systems, a slot may further be divided into multiple mini-slots containing one or more symbols. In some instances, a symbol of a mini-slot or a mini-slot may be the smallest unit of scheduling. Each symbol may vary in duration depending on the subcarrier spacing or frequency band of operation, for example. Further, some wireless communications systems may implement slot aggregation in which multiple slots or mini-slots are aggregated together and used for communication between a UE 115 and a base station 105.

The term "carrier" refers to a set of radio frequency spectrum resources having a defined physical layer structure for supporting communications over a communication link 125. For example, a carrier of a communication link 125 may include a portion of a radio frequency spectrum band that is operated according to physical layer channels for a given radio access technology. Each physical layer channel may carry user data, control information, or other signaling. A carrier may be associated with a pre-defined frequency channel (e.g., an Evolved Universal Terrestrial Radio Access (E-UTRA) absolute radio frequency channel number (EARFCN)), and may be positioned according to a channel raster for discovery by UEs 115. Carriers may be downlink or uplink (e.g., in an FDD mode), or be configured to carry downlink and uplink communications (e.g., in a TDD mode). In some examples, signal waveforms transmitted over a carrier may be made up of multiple sub-carriers (e.g., using multi-carrier modulation (MCM) techniques such as OFDM or discrete Fourier transform-spread-OFDM (DFT-S-OFDM)).

The organizational structure of the carriers may be different for different radio access technologies (e.g., LTE, LTE-A, LTE-A Pro, NR, etc.). For example, communications over a carrier may be organized according to TTIs or slots, each of which may include user data as well as control information or signaling to support decoding the user data. A carrier may also include dedicated acquisition signaling (e.g., synchronization signals or system information, etc.) and control signaling that coordinates operation for the carrier. In some examples (e.g., in a carrier aggregation configuration), a carrier may also have acquisition signaling or control signaling that coordinates operations for other carriers.

Physical channels may be multiplexed on a carrier according to various techniques. A physical control channel and a physical data channel may be multiplexed on a downlink carrier, for example, using time division multiplexing (TDM) techniques, frequency division multiplexing (FDM) techniques, or hybrid TDM-FDM techniques. In some examples, control information transmitted in a physical control channel may be distributed between different control regions in a cascaded manner (e.g., between a common control region or common search space and one or more UE-specific control regions or UE-specific search spaces).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of predetermined bandwidths for carriers of a particular radio access technology (e.g., 1.4, 3, 5, 10, 15, 20, 40, or 80 MHz). In some examples, each served UE 115 may be configured for operating over portions or all of the carrier bandwidth. In other examples, some UEs 115 may be configured for operation using a narrowband protocol type that is associated with a predefined portion or range (e.g., set of subcarriers or resource blocks (RBs)) within a carrier (e.g., "in-band" deployment of a narrowband protocol type).

In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme). Thus, the more resource elements that a UE 115 receives and the higher the order of the modulation scheme, the higher the data rate may be for the UE 115. In MIMO systems, a wireless communications resource may refer to a combination of a radio frequency spectrum resource, a time resource, and a spatial resource (e.g., spatial layers), and the use of multiple spatial layers may further increase the data rate for communications with a UE 115.

Devices of the wireless communications system 100 (e.g., base stations 105 or UEs 115) may have a hardware configuration that supports communications over a particular carrier bandwidth, or may be configurable to support communications over one of a set of carrier bandwidths. In some examples, the wireless communications system 100 may include base stations 105 and/or UEs that can support simultaneous communications via carriers associated with more than one different carrier bandwidth.

Wireless communications system 100 may support communication with a UE 115 on multiple cells or carriers, a feature which may be referred to as carrier aggregation or multi-carrier operation. A UE 115 may be configured with multiple downlink component carriers and one or more uplink component carriers according to a carrier aggregation configuration. Carrier aggregation may be used with both FDD and TDD component carriers.

In some cases, wireless communications system 100 may utilize enhanced component carriers (eCCs). An eCC may be characterized by one or more features including wider carrier or frequency channel bandwidth, shorter symbol duration, shorter TTI duration, or modified control channel configuration. In some cases, an eCC may be associated with a carrier aggregation configuration or a dual connectivity configuration (e.g., when multiple serving cells have a suboptimal or non-ideal backhaul link). An eCC may also be configured for use in unlicensed spectrum or shared spectrum (e.g., where more than one operator is allowed to use the spectrum). An eCC characterized by wide carrier bandwidth may include one or more segments that may be utilized by UEs 115 that are not capable of monitoring the whole carrier bandwidth or are otherwise configured to use a limited carrier bandwidth (e.g., to conserve power).

In some cases, an eCC may utilize a different symbol duration than other component carriers, which may include use of a reduced symbol duration as compared with symbol durations of the other component carriers. A shorter symbol duration may be associated with increased spacing between adjacent subcarriers. A device, such as a UE 115 or base station 105, utilizing eCCs may transmit wideband signals (e.g., according to frequency channel or carrier bandwidths of 20, 40, 60, 80 MHz, etc.) at reduced symbol durations (e.g., 16.67 microseconds). A TTI in eCC may consist of one or multiple symbol periods. In some cases, the TTI duration (that is, the number of symbol periods in a TTI) may be variable.

Wireless communications systems such as an NR system may utilize any combination of licensed, shared, and unlicensed spectrum bands, among others. The flexibility of eCC symbol duration and subcarrier spacing may allow for the use of eCC across multiple spectrums. In some examples, NR shared spectrum may increase spectrum utilization and spectral efficiency, specifically through dynamic vertical (e.g., across frequency) and horizontal (e.g., across time) sharing of resources.

In some wireless communications systems 100, base stations 105 and UEs 115 may implement carrier aggregation in combination with sTTIs. The wireless devices may utilize component carriers with different modes of operation.

For example, a base station 105 may transmit on the downlink using a TDD, LAA, or eLAA mode, or a combination thereof. These modes of operation may support a greater number of component carriers for carrier aggregation than an FDD mode. However, a UE 115 may transmit on the uplink using an FDD mode, as the FDD mode may be compatible with shorter sTTIs than the other modes of operation. For example, an FDD component carrier may support FS1 and sTTIs that are two OFDM symbols in length. In contrast, TDD component carriers may support FS2 and sTTIs that are seven OFDM symbols in length, and LAA or eLAA component carriers may support FS3 and TTIs that are fourteen OFDM symbols in length. In other cases, the different sTTIs may have variable or undefined lengths. For example, an FDD component carrier and a TDD component carrier may support sTTIs with any number of OFDM symbols (e.g., dynamically determined sTTI lengths), where the sTTI for the FDD component carrier spans a number of symbols that is less than the number of symbols spanned by the sTTI for the TDD component carrier.

To support enhanced downlink throughput with reduced HARQ latency, the base station 105 and UE 115 may implement a modified HARQ timeline. The base station 105 and UE 115 may identify a HARQ timing associated with downlink transmissions that is based on the sTTI for uplink, as opposed to the sTTI for downlink. The base station 105 may send a downlink transmission to the UE 115 on the FS2 or FS3 component carrier (e.g., using a seven or fourteen symbol sTTI or TTI and an SCell component carrier). The UE 115 may receive the downlink transmission and may send a downlink HARQ ACK/NACK message in response to the downlink transmission. For example, the UE 115 may perform a HARQ process to determine whether to send an ACK or NACK and may send the downlink HARQ ACK/NACK on the FS1 component carrier for uplink (e.g., using a two symbol sTTI and a PCell or PSCell component carrier). The UE 115 may send the downlink HARQ ACK/NACK to the base station 105 according to the identified HARQ timing. In this way, the base station 105 may utilize longer TTIs or sTTIs for downlink transmissions, supporting increased carrier aggregation and throughput, while the UE 115 may send HARQ feedback according to a faster timeframe based on shorter sTTIs, supporting reduced latency.

Figure 2:
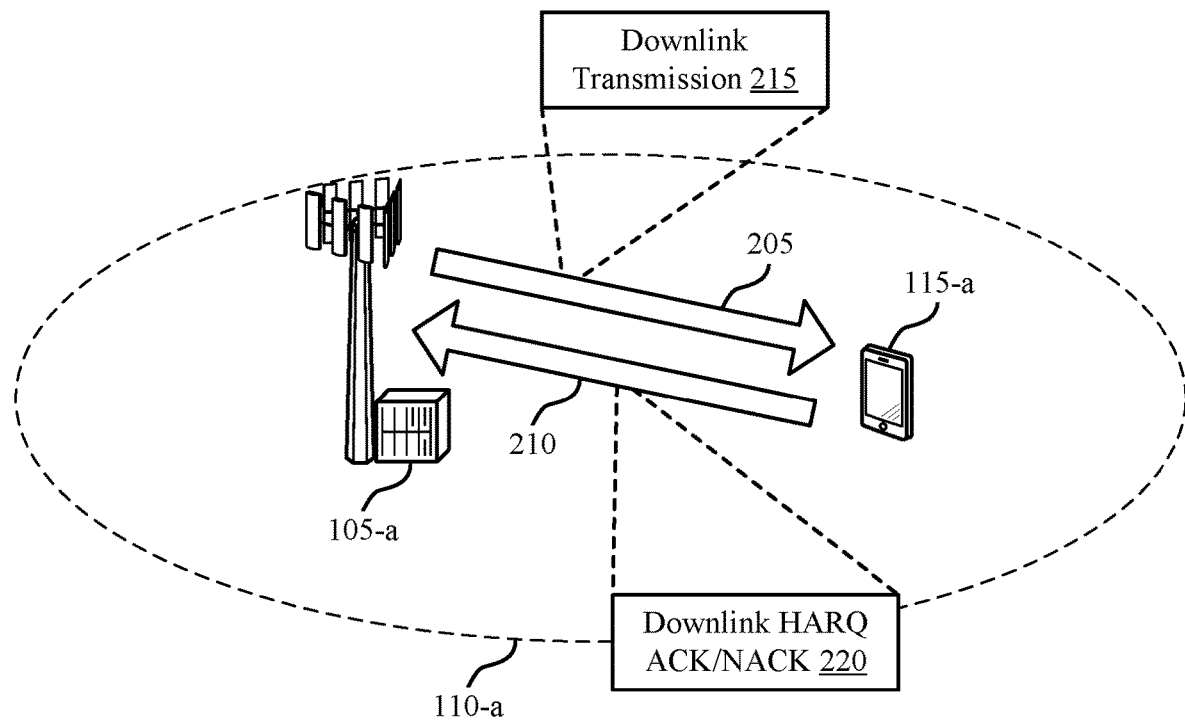

FIG. 2 illustrates an example of a wireless communications system 200 that supports carrier aggregation for downlink throughput enhancement in sTTI operation in accordance with aspects of the present disclosure. The wireless communications system 200 may include base station 105-*a* and UE 115-*a*, which may be examples of a base station 105 and a UE 115 as described with respect to FIG. 1. Base station 105-*a* may serve geographic coverage area 110-*a*, which may be an example of the corresponding area described with respect to FIG. 1. Base station 105-*a* may transmit to UE 115-*a* on the downlink 205 using a first component carrier, and UE 115-*a* may transmit to base station 105-*a* on the uplink 210 using a second component carrier. In some cases, the wireless communications system 200 may implement a modified downlink HARQ timeline to support improved throughput between base station 105-*a* and UE 115-*a*.

As discussed above (e.g., with respect to FIG. 1), base station 105-*a* and UE 115-*a* may communicate using carrier aggregation. For example, UE 115-*a* may receive downlink transmissions 215 over one or more downlink component carriers, and UE 115-*a* may transmit on the uplink 210 over one or more uplink component carriers. Additionally, the wireless communications system 200 may support sTTI operations, where base station 105-*a* and UE 115-*a* may transmit and receive communications in intervals shorter than a TTI. For example, a TTI may span a subframe (e.g., fourteen OFDM symbols), while an sTTI may span a shorter length of time (e.g., two, three, or seven OFDM symbols, or any other length shorter than a TTI).

In some cases, base station 105-*a* may serve one or more PUCCH groups, where each PUCCH group corresponds to a cell for uplink transmission. For example, UEs 115 operating within a first PUCCH group may map uplink transmissions to a first PCell or PSCell, while UEs 115 operating within a second PUCCH group may map uplink transmissions to a different PCell or PSCell. Base station 105-*a* and UEs 115 may utilize same length uplink TTIs or sTTIs and same length downlink TTIs or sTTIs across the component carriers of a PUCCH group. For example, some potential {downlink, uplink} sTTI length configurations for a PUCCH group include {2, 2}, {2, 7}, and {7, 7}, where the downlink and uplink sTTI lengths are measured in OFDM symbols. In this way, UE 115-*a* within a PUCCH group with sTTI length configuration {2, 7} may always receive transmissions in two symbol sTTIs on the downlink and transmit using seven symbol sTTIs on the uplink, no matter the selected component carrier. It should be noted that a two symbol sTTI configuration may include both two symbol and three symbol sTTIs (e.g., so that sTTIs do not span across slots within a subframe).

Base station 105-*a* and UE 115-*a* may operate in FDD, TDD, LAA, or eLAA modes. Similarly, base station 105-*a* and UE 115-*a* may transmit and receive signals on component carriers using FS1 (e.g., for FDD mode), FS2 (e.g., for TDD mode), or FS3 (e.g., for LAA mode or eLAA mode). In some cases, operating in FDD mode may support shorter sTTIs than the TDD, LAA, or eLAA modes. For example, a wireless device operating in an FDD mode may transmit and receive transmissions using a two symbol sTTI configuration, while a wireless device operating in TDD, LAA, or eLAA mode may transmit and receive using a seven symbol sTTI or a fourteen symbol TTI. However, TDD, LAA, and eLAA modes may support aggregation of a greater number of component carriers than the FDD mode. Accordingly, the wireless communications system 200 may experience a tradeoff between number of component carriers and sTTI length.

To enhance the system throughput, the wireless communications system 200 may utilize the benefits of both FS1 component carriers and FS2 or FS3 component carriers to reduce the latency in HARQ feedback. Base station 105-*a* may include PUCCH groups with both FS1 component carriers and FS2 or FS3 component carriers. For such PUCCH groups, base station 105-*a* may configure the FS1 component carriers with shorter sTTIs than the FS2 or FS3 component carriers. For example, the wireless communications system 200 may support FDD and TDD carrier aggregation, where one PUCCH group may contain one or more FS1 component carriers configured with two OFDM symbol sTTIs and one or more FS2 component carriers configured with seven OFDM symbol sTTIs. To improve throughput by increasing the number of carriers, base station 105-*a* may transmit downlink transmissions 215 in seven OFDM symbol sTTIs implementing TDD. To reduce the downlink HARQ feedback latency in response to this downlink transmission 215, UE 115-*a* may send the downlink HARQ ACK/NACK 220 to base station 105-*a* in a two OFDM symbol sTTI (e.g., as opposed to the longer seven OFDM symbol sTTI) implementing FDD. Such an sTTI configuration may be referred to as a {7, 2} configuration. In some cases, the wireless communications system 200 may utilize the {7, 2} configuration for downlink HARQ scheduling, and may utilize other configurations (e.g., {7, 7}) for other scheduling, such as physical uplink shared channel (PUSCH) scheduling. Additionally, base station 105-*a* and UE 115-*a* may operate with a HARQ timeline defined by the shorter sTTI (e.g., the two symbol sTTI). That is, for a HARQ timeline incorporating an n+4 turn-around time, UE 115-*a* may transmit the downlink HARQ ACK/NACK 220 in the fourth two symbol sTTI following the downlink transmission 215, as opposed to in the fourth seven symbol sTTI.

UE 115-*a* may transmit the downlink HARQ ACK/NACK 220 in the PUCCH. As PCells and PSCells may include PUCCH resources—and SCells may not—the PCell component carrier, PSCell component carrier, or both may support two OFDM symbol sTTIs for the faster HARQ turn-around time. In some cases, to support this shorter sTTI, the PCell component carrier, PSCell component carrier, or both may be examples of FS1 component carriers operating in FDD mode on the uplink 210. In these cases, SCell component carriers in the uplink 210 may be examples of either FS1 component carriers with shorter sTTIs (e.g., two symbols) or FS2 component carriers with longer sTTIs (e.g., seven symbols). UE 115-*a* may transmit uplink shared channel (UL-SCH) transmissions on any of these component carriers.

In some cases, the HARQ timeline may further be determined based on capabilities of a UE 115. For example, the wireless communications system 200 may enable a faster HARQ timing (e.g., based on shorter sTTIs) if UE 115-*a* is capable of managing and handling this faster HARQ timing. Accordingly, in some cases, UE 115 capabilities or limitations may affect the downlink HARQ timing. Some example UE capabilities or parameters that may affect HARQ timing include, but are not limited to, transport block size (TBS), number of layers, reference signal type for data or control channels, lengths of a physical downlink control channel (PDCCH), lengths of a shortened PDCCH, number of blind decodes, search space size in a PDCCH or shortened PDCCH, etc.

In some cases, the wireless communications system 200 may implement relaxed HARQ timing (e.g., n+6 instead of n+4 used over the PCell component carrier with a two symbol sTTI) based on any combination of these or other UE capabilities. In one example, the HARQ timing supported by the UE 115 may be based on the component carrier configuration. Base station 105-*a* may configure a number of component carriers for UE 115-*a* as described above. UE 115-*a* may determine its HARQ timing capabilities based on the number of component carriers configured with a certain length TTI or sTTI (e.g., the number of component carriers configured with the longer length TTI or sTTI), based on the total number of component carriers configured for UE 115-*a*, or based on some combination of these. UE 115-*a* may transmit an indication to base station 105-*a* of this UE capability. In a first example, UE 115-*a* may transmit an indication of the supported downlink HARQ turn-around time based on the component carrier configuration. In a second example, UE 115-*a* may transmit an indication of rules or parameters for supporting different downlink HARQ turn-around times. That is, UE 115-*a* may indicate a threshold number of component carriers configured for UE 115-*a* (e.g., a total number of configured component carriers or a number of component carriers with TTIs or sTTIs of a certain length) above which UE 115-*a* may support a faster downlink HARQ turn-around time and base station 105-*a* may determine the downlink HARQ turn-around timing when configuring the component carriers based on the indicated rules.

In some cases, the downlink HARQ timing may affect the UE capabilities. For example, if UE 115-*a* reduces its downlink HARQ turn-around time, UE 115-*a* may introduce one or more limitations on any combination of the above UE capabilities, or any other relevant UE capabilities. Additionally or alternatively, the modified HARQ timing, the UE capabilities, or both may affect the maximum timing advance (TA) supported by UE 115-*a*. In some examples, UE 115-*a* may explicitly signal an indication of one or more UE capabilities or the TA to base station 105-*a*, and base station 105-*a* may utilize this reported information during scheduling and downlink HARQ ACK/NACK 220 reception.

The wireless communications system 200 may support similar techniques for FDD and LAA or eLAA carrier aggregation. For example, one PUCCH group may contain one or more FS1 component carriers configured with two OFDM symbol sTTIs and one or more FS3 component carriers configured with fourteen OFDM symbol TTIs. An FS3 transmission opportunity (TxOP) may be configured with all downlink subframes, all uplink subframes, or a portion of downlink subframes followed by a portion of uplink subframes. In some cases, base station 105-*a* may perform subframe splitting, and may separate the fourteen symbol TTI into two slots (e.g., of seven OFDM symbols each). In this way, base station 105-*a* and UE 115-*a* implementing FDD and LAA or eLAA modes may utilize a {14, 2} or {7, 2} configuration. In these cases, the PCell component carrier, PSCell component carrier, or both may be examples of FS1 carriers operating in FDD mode—and, accordingly may support two symbol transmissions and timelines on the uplink 210—while the SCell component carriers may be examples of FS1 component carriers, FS3 component carriers, or even FS2 component carriers.

Figure 3:
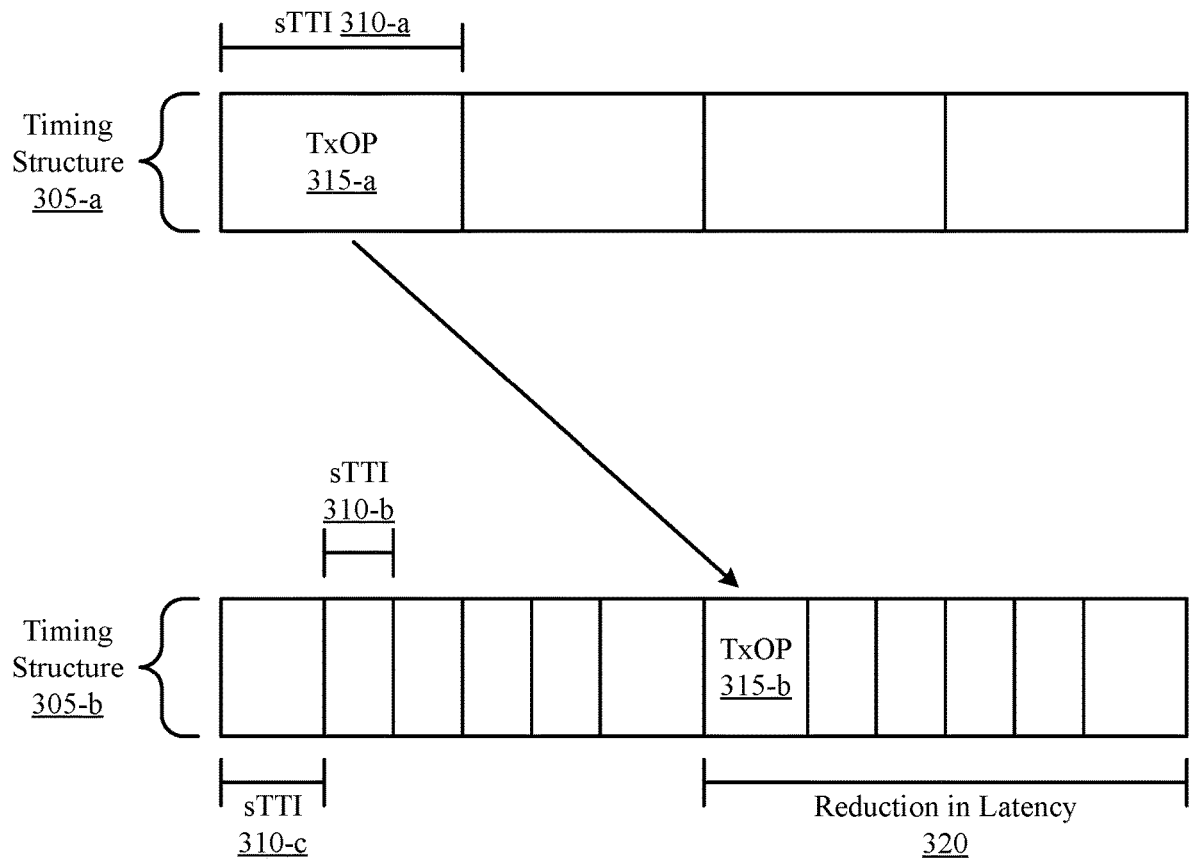
FIG. 3 illustrates an example of downlink hybrid automatic repeat request (HARQ) timing that supports carrier aggregation for downlink throughput enhancement in sTTI operation in accordance with aspects of the present disclosure.

FIG. 3 illustrates an example of downlink HARQ timing 300 that supports carrier aggregation for downlink throughput enhancement in sTTI operation in accordance with aspects of the present disclosure. The downlink HARQ timing 300 may be implemented by a wireless communications system 100 or 200 as discussed above with reference to FIGS. 1 and 2. For example, a base station 105 may transmit downlink transmissions according to timing structure 305-*a*, while a UE 115 may transmit uplink transmissions according to timing structure 305-*b*. By implementing FDD and TDD, LAA, or eLAA carrier aggregation, the base station 105 and UE 115 may increase downlink signal throughput while reducing HARQ feedback latency.

As illustrated, a base station 105 may operate in the downlink using sTTIs 310-*a* with lengths of seven OFDM symbols. The base station 105 may transmit to a UE 115 over an FS2 SCell component carrier in a TDD mode. Implementing the TDD mode may allow for greater carrier aggregation than an FDD mode. Although illustrated and described with respect to seven symbol sTTIs, the base station 105 may additionally or alternatively operate in the downlink using fourteen symbol TTIs or split TTIs over an FS3 SCell component carrier using an LAA or eLAA mode.

In TxOP 315-*a*, the base station 105 may send a transmission on the downlink to the UE 115 using the timing structure 305-*a* and an sTTI 310-*a*. The UE 115 may receive the downlink transmission (e.g., a physical downlink shared channel (PDSCH) transmission) from the base station 105 and may determine a HARQ response. For example, if the UE 115 successfully receives and decodes the downlink transmission, the UE 115 may determine to send a downlink HARQ ACK response on the uplink to the base station 105. Alternatively, if the UE 115 does not successfully receive or decode the downlink transmission, the UE 115 may determine to send a downlink HARQ NACK response on the uplink. In either case, the UE 115 may transmit the downlink HARQ ACK/NACK message according to timing structure 305-*b*. For example, the UE 115 may transmit the downlink HARQ ACK/NACK in PUCCH resources of a PCell component carrier or PSCell component carrier. To support an improved HARQ timing, the PCell component carrier, PSCell component carrier, or both may be examples of FS1 component carriers operating in an FDD mode. The FS1 component carriers may be configured with two OFDM symbol sTTIs 310-*b*. As illustrated, in some cases the FS1 timing structure 305-*b* may include a mix of two OFDM symbol sTTIs 310-*b* and three OFDM symbol sTTIs 310-*c*, such that no sTTIs 310 span across slots (e.g., the first three sTTIs 310 for timing structure 305-*b* correspond to the first sTTI 310 for timing structure 305-*a*).

The UE 115 may process the downlink transmission according to the faster timing structure 305-*b*. For example, the base station 105 and UE 115 may operate using an n+4 HARQ timeline. The UE 115 may perform a HARQ process based on the received downlink transmission and may transmit an ACK or NACK in response in the n+4$^{th}$ sTTI 310 according to timing structure 305-*b* (e.g., as opposed to timing structure 305-*a*). In such an example, where the base station 105 transmits the downlink transmission in TxOP 315-*a*, the UE 115 may perform the HARQ process and prepare a downlink HARQ response for transmission in TxOP 315-*b*. At TxOP 315-*b*, the UE 115 may transmit the downlink HARQ ACK/NACK in the PUCCH resources of the PCell or PSCell to the base station 105. By utilizing HARQ timing based on the shorter sTTIs 310 for the uplink FS1 component carriers as opposed to the longer sTTIs 310 for the downlink FS2 or FS3 component carriers (e.g., the longer sTTI 310 used for the downlink transmission), the UE 115 and base station 105 may reduce the latency of the downlink HARQ feedback process by an amount of time 320 (e.g., a one subframe latency reduction). In this way, the system may support increased carrier aggregation in the downlink using TDD, LAA, or eLAA while reducing downlink HARQ latency in the uplink using FDD.

As discussed above (e.g., with reference to FIG. 2), the HARQ timing may be further based on UE capabilities or limitations. Additionally or alternatively, the UE 115 may modify UE capabilities or limitations based on the determined HARQ timing. In some cases, the base station 105 may select the HARQ timeline to implement on a component carrier-by-component carrier, cell-by-cell, or cell type-by-cell type basis. The base station 105 may implicitly or explicitly indicate this selected HARQ timeline to the UE 115 in a downlink transmission or configuration procedure.

Figure 4:
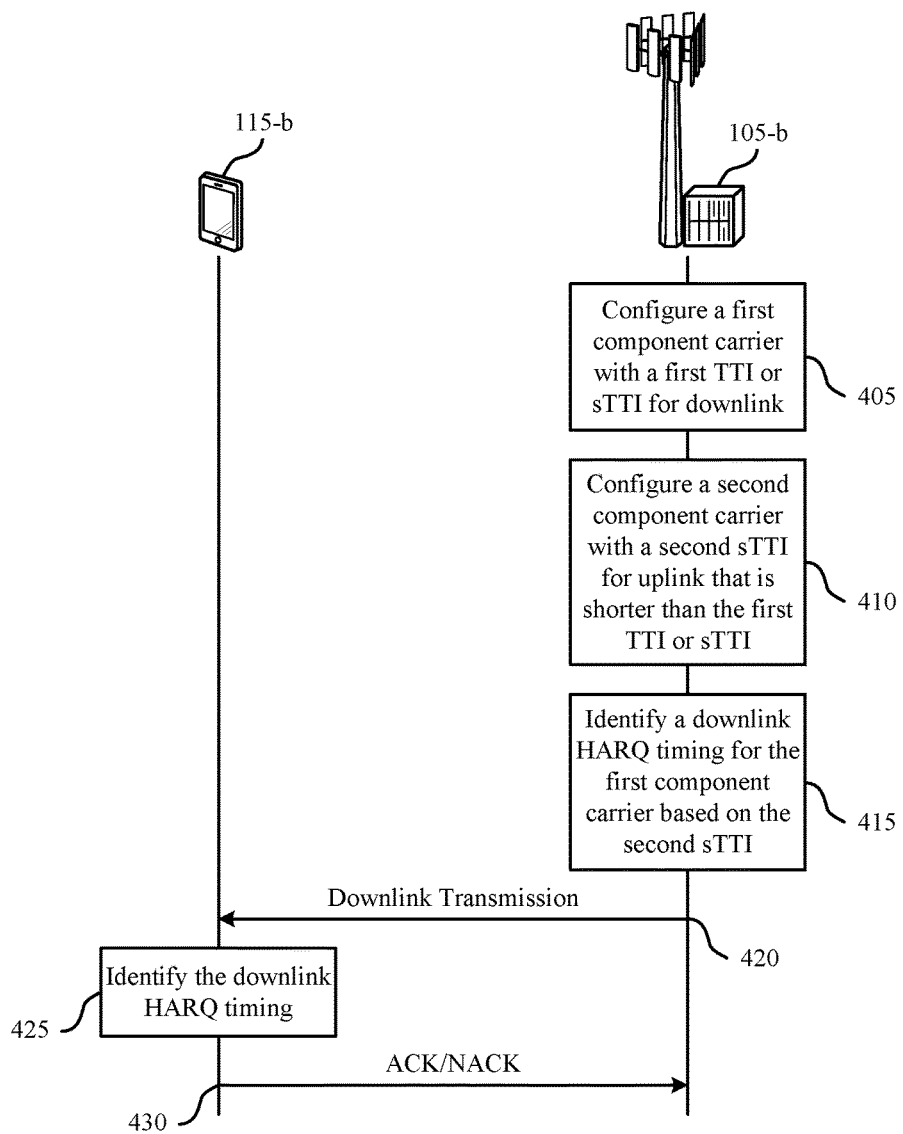
FIG. 4 illustrates an example of a process flow that supports carrier aggregation for downlink throughput enhancement in sTTI operation in accordance with aspects of the present disclosure.

FIG. 4 illustrates an example of a process flow 400 that supports carrier aggregation for downlink throughput enhancement in sTTI operation in accordance with aspects of the present disclosure. The process flow 400 may include base station 105-*b* and UE 115-*b*, which may be examples of the devices described above, for example, with reference to FIGS. 1 through 3. Alternative examples of the following may be implemented, where some steps are performed in a different order than described or are not performed at all. In some cases, steps may include additional features not mentioned below, or further steps may be added.

At 405, base station 105-*b* may configure a first component carrier with a first TTI or sTTI for downlink transmissions. For example, the first component carrier may operate in a TDD mode, and base station 105-*b* may configure the first sTTI to span seven OFDM symbols. In another example, the first component carrier may operate in an LAA or eLAA mode, and base station 105-*b* may configure the first TTI or sTTI to span fourteen or seven OFDM symbols. The first component carrier may be an example of an SCell component carrier.

At 410, base station 105-*b* may configure a second component carrier with a second sTTI for uplink transmissions. The second sTTI for the second component carrier may be shorter in length than the first TTI or sTTI for the first component carrier. In other words, whichever TTI of the first TTI or the first sTTI was configured for the first component carrier by the base station 105-*b*, the second sTTI configured for the second component carrier may be shorter in length than that TTI. For example, the second component carrier may operate in an FDD mode, and the second sTTI may be configured to span two OFDM symbols. In some cases, a component carrier configured with two symbol sTTIs may include a mix of two symbol and three symbol sTTIs (e.g., so that each sTTI may be contained within a single slot of an OFDM subframe). In some cases, the second component carrier may be an example of a PCell or PSCell component carrier. The first component carrier and the second component carrier may correspond to a same PUCCH group for base station 105-*b*.

At 415, base station 105-*b* may identify a HARQ timing for the first component carrier based on the second sTTI configured for the second component carrier. For example, while base station 105-*b* may transmit on the downlink over the first component carrier according to a seven or fourteen symbol sTTI or TTI, downlink HARQ timing in response to this downlink transmission may be based on the two symbol sTTI of the second component carrier. In some cases, the HARQ timing may further be based on UE capabilities, such as capabilities of UE 115-*b*. Basing the downlink HARQ timing on the second sTTI as opposed to the first TTI or sTTI may reduce latency for the downlink HARQ process.

At 420, base station 105-*b* may perform a downlink transmission over the first carrier using the first TTI or sTTI. In other words, whichever TTI of the first TTI or the first sTTI was configured for the first component carrier by the base station 105-*b*, the base station 105-*b* may perform a downlink transmission over the first carrier using that TTI. In some cases, base station 105-*b* may include an explicit indication of the HARQ timing in the downlink transmission (e.g., in the downlink control information (DCI)). UE 115-*b* may receive the downlink transmission over the first component carrier. Transmitting the downlink transmission using the longer TTI or sTTI length may improve throughput on the downlink.

At 425, UE 115-*b* may identify the HARQ timing for the first component carrier. In some cases, UE 115-*b* may determine the HARQ timing based on information in the received downlink transmission. In other cases, UE 115-*b* may determine the HARQ timing based on implicit relationships (e.g., including UE capabilities of UE 115-*b*, characteristics of the component carriers such as a number of configured component carriers, or some combination of these or other parameters). For example, in some cases, UE 115-*b* may determine the HARQ timing independent of receiving the downlink transmission from base station 105-*b*.

At 430, UE 115-*b* may transmit a downlink HARQ ACK/NACK message to base station 105-*b* in response to the received downlink transmission, where the downlink HARQ ACK/NACK is transmitted according to the identified HARQ timing. For example, if UE 115-*b* identifies that it failed to successfully receive the downlink transmission, UE 115-*b* may transmit a NACK at 430. In some cases when receiving a NACK, base station 105-*b* may retransmit the downlink transmission in response. Alternatively, if reception of the downlink transmission was successful, UE 115-*b* may transmit an ACK at 430 according to the downlink HARQ process. UE 115-*b* may transmit the downlink HARQ ACK/NACK message to base station 105-*b* over the second component carrier using the second sTTI. In this way, the downlink transmission and the downlink HARQ ACK/NACK message sent in response may be transmitted using different timing structures.

Figure 5:
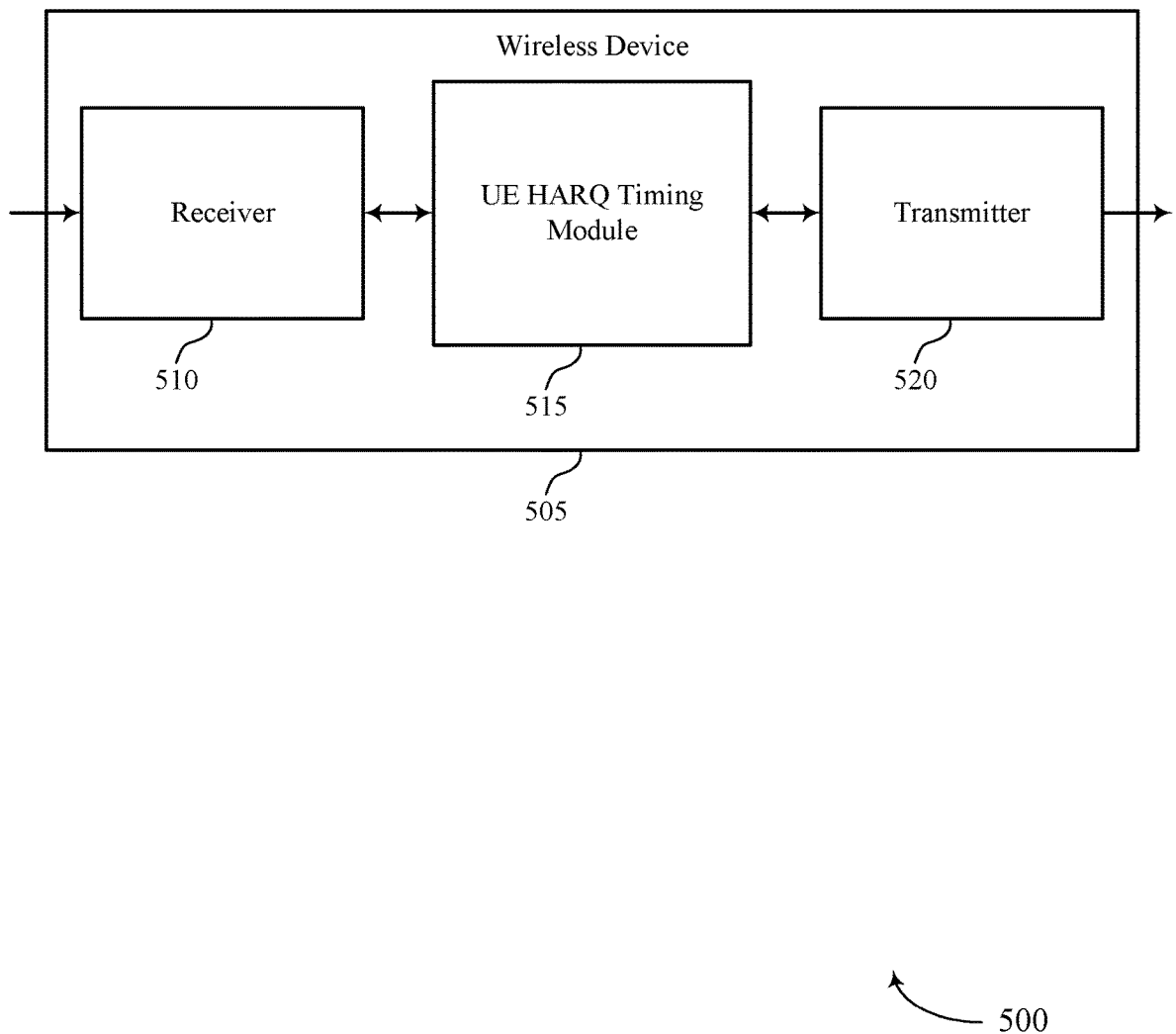
FIGS. 5 and 6 show block diagrams of a wireless device that supports carrier aggregation for downlink throughput enhancement in sTTI operation in accordance with aspects of the present disclosure.

FIG. 5 shows a block diagram 500 of a wireless device 505 that supports carrier aggregation for downlink throughput enhancement in sTTI operation in accordance with aspects of the present disclosure. Wireless device 505 may be an example of aspects of a UE 115 as described herein. Wireless device 505 may include receiver 510, UE HARQ timing module 515, and transmitter 520. Wireless device 505 may also include a processor. Each of these components may be in communication with one another (e.g., via one or more buses).

Receiver 510 may receive information such as packets, user data, or control information associated with various information channels (e.g., control channels, data channels, and information related to carrier aggregation for downlink throughput enhancement in sTTI operation, etc.). Information may be passed on to other components of the device. The receiver 510 may be an example of aspects of the transceiver 835 described with reference to FIG. 8. The receiver 510 may utilize a single antenna or a set of antennas.

UE HARQ timing module 515 may be an example of aspects of the UE HARQ timing module 615, 715, or 815 described with reference to FIGS. 6 through 8. UE HARQ timing module 515 and/or at least some of its various sub-components may be implemented in hardware, software executed by a processor, firmware, or any combination thereof. If implemented in software executed by a processor, the functions of the UE HARQ timing module 515 and/or at least some of its various sub-components may be executed by a general-purpose processor, a digital signal processor (DSP), an application-specific integrated circuit (ASIC), a field-programmable gate array (FPGA) or other programmable logic device, discrete gate or transistor logic, discrete hardware components, or any combination thereof designed to perform the functions described in the present disclosure. The UE HARQ timing module 515 and/or at least some of its various sub-components may be physically located at various positions, including being distributed such that portions of functions are implemented at different physical locations by one or more physical devices. In some examples, UE HARQ timing module 515 and/or at least some of its various sub-components may be a separate and distinct component in accordance with various aspects of the present disclosure. In other examples, UE HARQ timing module 515 and/or at least some of its various sub-components may be combined with one or more other hardware components, including but not limited to an input/output (I/O) component, a transceiver, a network server, another computing device, one or more other components described in the present disclosure, or a combination thereof in accordance with various aspects of the present disclosure.

UE HARQ timing module 515 may identify a HARQ timing for a first component carrier configured with a first TTI or sTTI and associated with downlink transmissions, the HARQ timing for the first component carrier based on a second sTTI configured for a second component carrier associated with uplink transmissions, where the second sTTI is shorter than the first TTI or sTTI. Furthermore, UE HARQ timing module 515 may receive a downlink transmission over the first component carrier using the first TTI or sTTI and may transmit a downlink HARQ ACK/NACK message corresponding to the downlink transmission according to the identified HARQ timing.

Transmitter 520 may transmit signals generated by other components of the device. In some examples, the transmitter 520 may be collocated with a receiver 510 in a transceiver module. For example, the transmitter 520 may be an example of aspects of the transceiver 835 described with reference to FIG. 8. The transmitter 520 may utilize a single antenna or a set of antennas.

Figure 6:
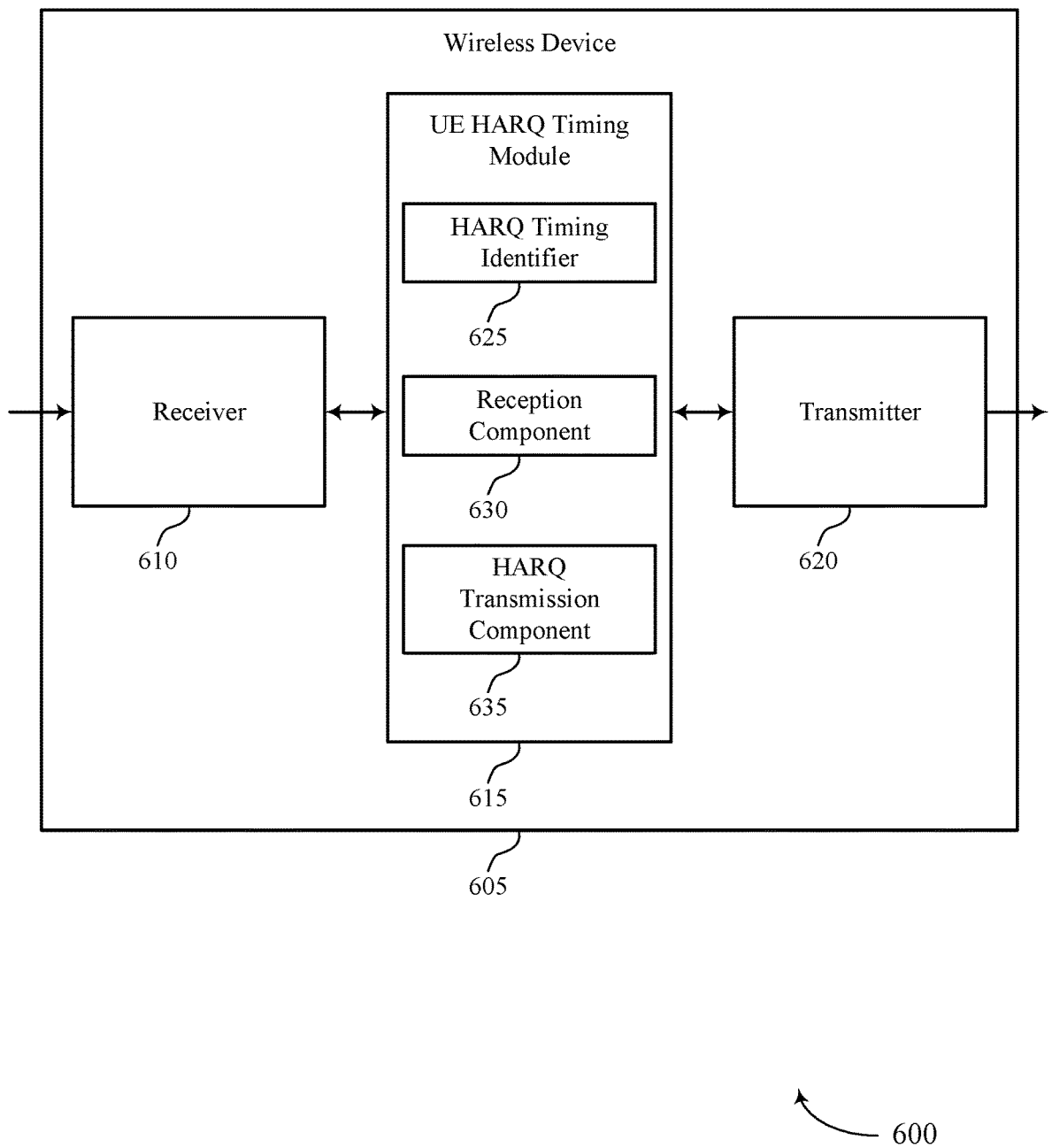

FIG. 6 shows a block diagram 600 of a wireless device 605 that supports carrier aggregation for downlink throughput enhancement in sTTI operation in accordance with aspects of the present disclosure. Wireless device 605 may be an example of aspects of a wireless device 505 or a UE 115 as described with reference to FIGS. 1 through 5. Wireless device 605 may include receiver 610, UE HARQ timing module 615, and transmitter 620. Wireless device 605 may also include a processor. Each of these components may be in communication with one another (e.g., via one or more buses).

Receiver 610 may receive information such as packets, user data, or control information associated with various information channels (e.g., control channels, data channels, and information related to carrier aggregation for downlink throughput enhancement in sTTI operation, etc.). Information may be passed on to other components of the device. The receiver 610 may be an example of aspects of the transceiver 835 described with reference to FIG. 8. The receiver 610 may utilize a single antenna or a set of antennas.

UE HARQ timing module 615 may be an example of aspects of the UE HARQ timing module 515, 715, or 815 described with reference to FIGS. 5, 7, and 8. UE HARQ timing module 615 may also include HARQ timing identifier 625, reception component 630, and HARQ transmission component 635.

HARQ timing identifier 625 may identify a HARQ timing for a first component carrier configured with a first TTI or sTTI and associated with downlink transmissions, the HARQ timing for the first component carrier based on a second sTTI configured for a second component carrier associated with uplink transmissions, where the second sTTI is shorter than the first TTI or sTTI. In some cases, identifying the HARQ timing for the first component carrier may include receiving an indication of the HARQ timing over the first component carrier (e.g., in DCI).

Reception component 630 may receive a downlink transmission over the first component carrier using the first TTI or sTTI. In some cases, reception component 630 may be a component of the receiver 610. HARQ transmission component 635 may transmit a downlink HARQ ACK/NACK message corresponding to the downlink transmission according to the identified HARQ timing. In some cases, the downlink HARQ ACK/NACK message is transmitted over the second component carrier using the second sTTI. HARQ transmission component 635 may be a component of the transmitter 620.

Transmitter 620 may transmit signals generated by other components of the device. In some examples, the transmitter 620 may be collocated with a receiver 610 in a transceiver module. For example, the transmitter 620 may be an example of aspects of the transceiver 835 described with reference to FIG. 8. The transmitter 620 may utilize a single antenna or a set of antennas.

Figure 7:
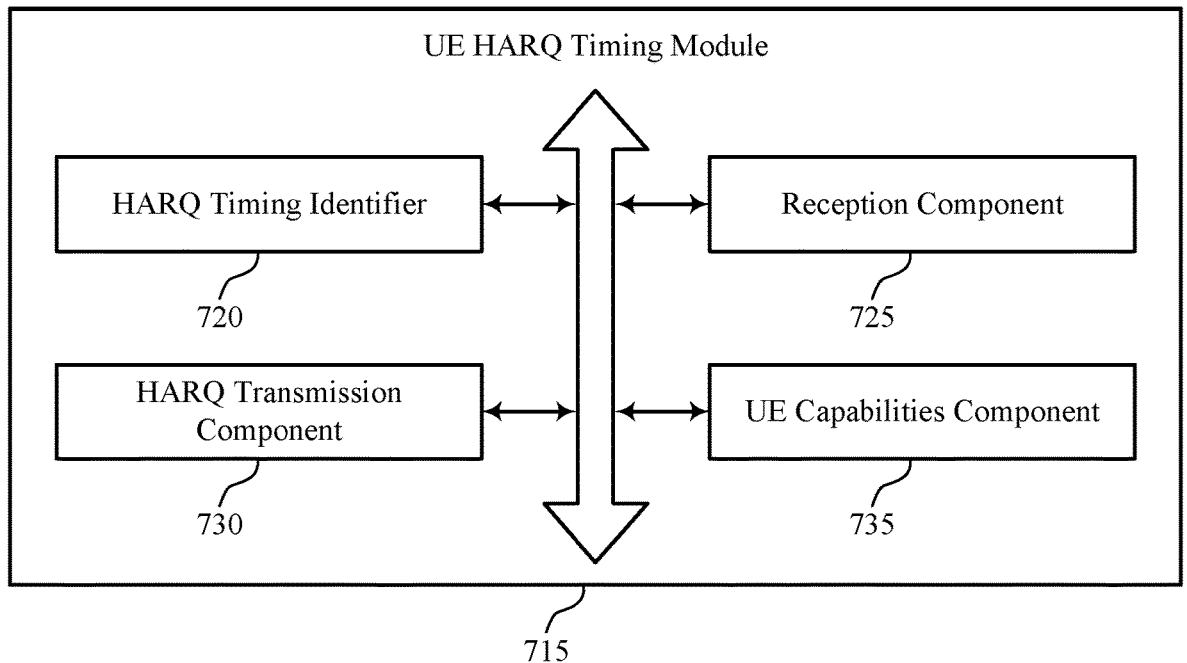
FIG. 7 shows a block diagram of a user equipment (UE) HARQ timing module that supports carrier aggregation for downlink throughput enhancement in sTTI operation in accordance with aspects of the present disclosure.

FIG. 7 shows a block diagram 700 of a UE HARQ timing module 715 that supports carrier aggregation for downlink throughput enhancement in sTTI operation in accordance with aspects of the present disclosure. The UE HARQ timing module 715 may be an example of aspects of a UE HARQ timing module 515, 615, or 815 described with reference to FIGS. 5, 6, and 8. The UE HARQ timing module 715 may include HARQ timing identifier 720, reception component 725, HARQ transmission component 730, and UE capabilities component 735. Each of these modules may communicate, directly or indirectly, with one another (e.g., via one or more buses).

HARQ timing identifier 720 may identify a HARQ timing for a first component carrier configured with a first TTI or sTTI and associated with downlink transmissions, the HARQ timing for the first component carrier based on a second sTTI configured for a second component carrier associated with uplink transmissions, where the second sTTI is shorter than the first TTI or sTTI. In some cases, identifying the HARQ timing for the first component carrier may include receiving an indication of the HARQ timing over the first component carrier. In some cases, the first component carrier and the second component carrier correspond to a same PUCCH group. The first component carrier may be configured in a TDD mode, an LAA mode, an eLAA mode, or a combination thereof. In some cases, the first component carrier or the second component carrier may be configured in an FDD mode. In one example, the first TTI or sTTI may span seven OFDM symbols or fourteen OFDM symbols. In some cases, the TTI is split into two slots, and the downlink transmission is received over each of the two slots (e.g., by reception component 725). The second sTTI may span two or three OFDM symbols. In some cases, the first component carrier is an example of an SCell component carrier, while the second component carrier is an example of a PCell or PSCell component carrier.

Reception component 725 may receive a downlink transmission over the first component carrier using the first TTI or sTTI. This reception of the downlink transmission may be successful or unsuccessful (e.g., the reception may be unsuccessful if the downlink transmission is not correctly decoded by the receiving device). HARQ transmission component 730 may transmit a downlink HARQ ACK/NACK message corresponding to the downlink transmission according to the identified HARQ timing. In some cases, the downlink HARQ ACK/NACK message is transmitted over the second component carrier using the second sTTI. The downlink HARQ ACK/NACK message may indicate whether the downlink transmission was received successfully by reception component 725.

UE capabilities component 735 may transmit an indication of one or more UE capabilities of a UE, where the HARQ timing is further based on the one or more UE capabilities of the UE. In some cases, UE capabilities component 735 may determine a maximum TA based on the second sTTI, the one or more UE capabilities, or a combination thereof. In some cases, the one or more UE capabilities include a TBS, a number of layers, a reference signal type, a PDCCH transmission duration, an sTTI PDCCH transmission duration, a number of blind decodes, a search space size for the PDCCH or the sTTI PDCCH, or a combination thereof. The UE capabilities of the UE may be capabilities of the UE 115 transmitting the downlink HARQ ACK/NACK message (i.e., the UE 115 containing the UE HARQ timing module 715). In some cases, UE capabilities component 735 may determine a number of component carriers configured with the first TTI or sTTI, a total number of component carriers configured for the UE 115, or a combination thereof, where the indication of the one or more UE capabilities is based on the number of component carriers configured with the first TTI or sTTI, the total number of component carriers configured for the UE, or the combination thereof.

Figure 8:
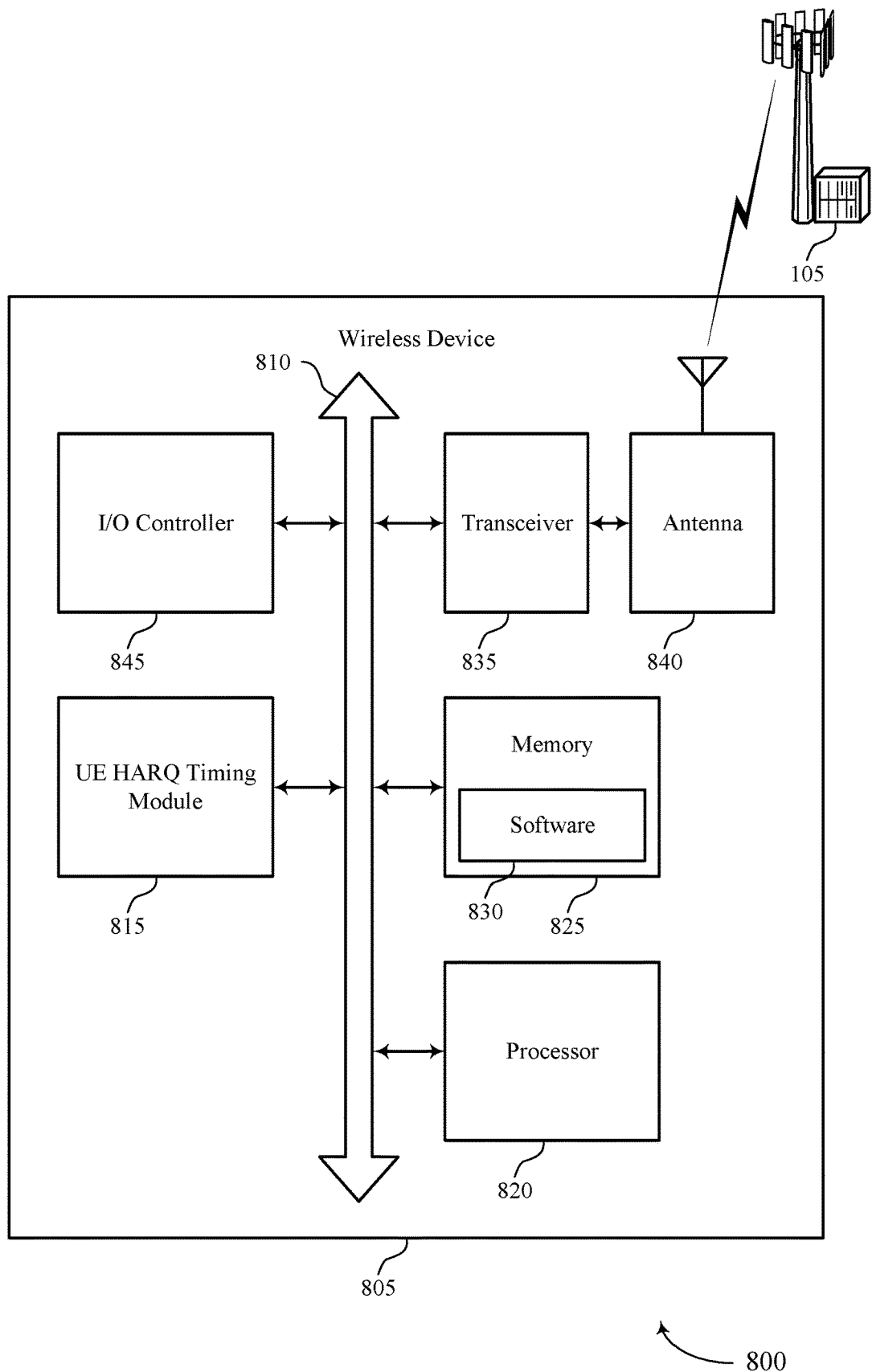
FIG. 8 shows a diagram of a system including a wireless device that supports carrier aggregation for downlink throughput enhancement in sTTI operation in accordance with aspects of the present disclosure.

FIG. 8 shows a diagram of a system 800 including a wireless device 805 that supports carrier aggregation for downlink throughput enhancement in sTTI operation in accordance with aspects of the present disclosure. Wireless device 805 may be an example of or include the components of wireless device 505, wireless device 605, or a UE 115 as described above, e.g., with reference to FIGS. 1 through 6. Wireless device 805 may include components for bi-directional voice and data communications including components for transmitting and receiving communications, including UE HARQ timing module 815, processor 820, memory 825, software 830, transceiver 835, antenna 840, and I/O controller 845. UE HARQ timing module 815 may be an example of a UE HARQ timing module 715 as described above with reference to FIG. 7. These components may be in electronic communication via one or more buses (e.g., bus 810). Wireless device 805 may communicate wirelessly with one or more base stations 105.

Processor 820 may include an intelligent hardware device (e.g., a general-purpose processor, a DSP, a central processing unit (CPU), a microcontroller, an ASIC, an FPGA, a programmable logic device, a discrete gate or transistor logic component, a discrete hardware component, or any combination thereof). In some cases, processor 820 may be configured to operate a memory array using a memory controller. In other cases, a memory controller may be integrated into processor 820. Processor 820 may be configured to execute computer-readable instructions stored in a memory to perform various functions (e.g., functions or tasks supporting carrier aggregation for downlink throughput enhancement in sTTI operation), for example, functions with reference to FIGS. 13, 14, and 15. In one implementation, for example, the processor may retrieve instructions stored in the memory 825 and executable by the processor 820 to cause the apparatus to perform the various functions with reference to FIGS. 13, 14, and 15. In one example, the processor 820 causing the apparatus to perform the functions may include the processor causing the transceiver 835 to perform one or more, or all, of the functions.

Memory 825 may include random access memory (RAM) and read only memory (ROM). The memory 825 may store computer-readable, computer-executable software 830 including instructions that, when executed, cause the processor to perform various functions described herein. In some cases, the memory 825 may contain, among other things, a basic input/output system (BIOS) which may control basic hardware or software operation such as the interaction with peripheral components or devices.

Software 830 may include code to implement aspects of the present disclosure, including code to support carrier aggregation for downlink throughput enhancement in sTTI operation. Software 830 may be stored in a non-transitory computer-readable medium such as system memory or other memory. In some cases, the software 830 may not be directly executable by the processor 820 but may cause a computer (e.g., when compiled and executed) to perform functions described herein.

Transceiver 835 may communicate bi-directionally, via one or more antennas, wired, or wireless links as described above. For example, the transceiver 835 may represent a wireless transceiver and may communicate bi-directionally with another wireless transceiver. The transceiver 835 may also include a modem to modulate the packets and provide the modulated packets to the antennas for transmission, and to demodulate packets received from the antennas.

In some cases, the wireless device may include a single antenna 840. However, in some cases the device may have more than one antenna 840, which may be capable of concurrently transmitting or receiving multiple wireless transmissions.

I/O controller 845 may manage input and output signals for wireless device 805. I/O controller 845 may also manage peripherals not integrated into wireless device 805. In some cases, I/O controller 845 may represent a physical connection or port to an external peripheral. In some cases, I/O controller 845 may utilize an operating system such as iOS®, ANDROID®, MS-DOS®, MS-WINDOWS®, OS/2®, UNIX®, LINUX®, or another known operating system. In other cases, I/O controller 845 may represent or interact with a modem, a keyboard, a mouse, a touchscreen, or a similar device. In some cases, I/O controller 845 may be implemented as part of a processor. In some cases, a user may interact with wireless device 805 via I/O controller 845 or via hardware components controlled by I/O controller 845.

Figure 9:
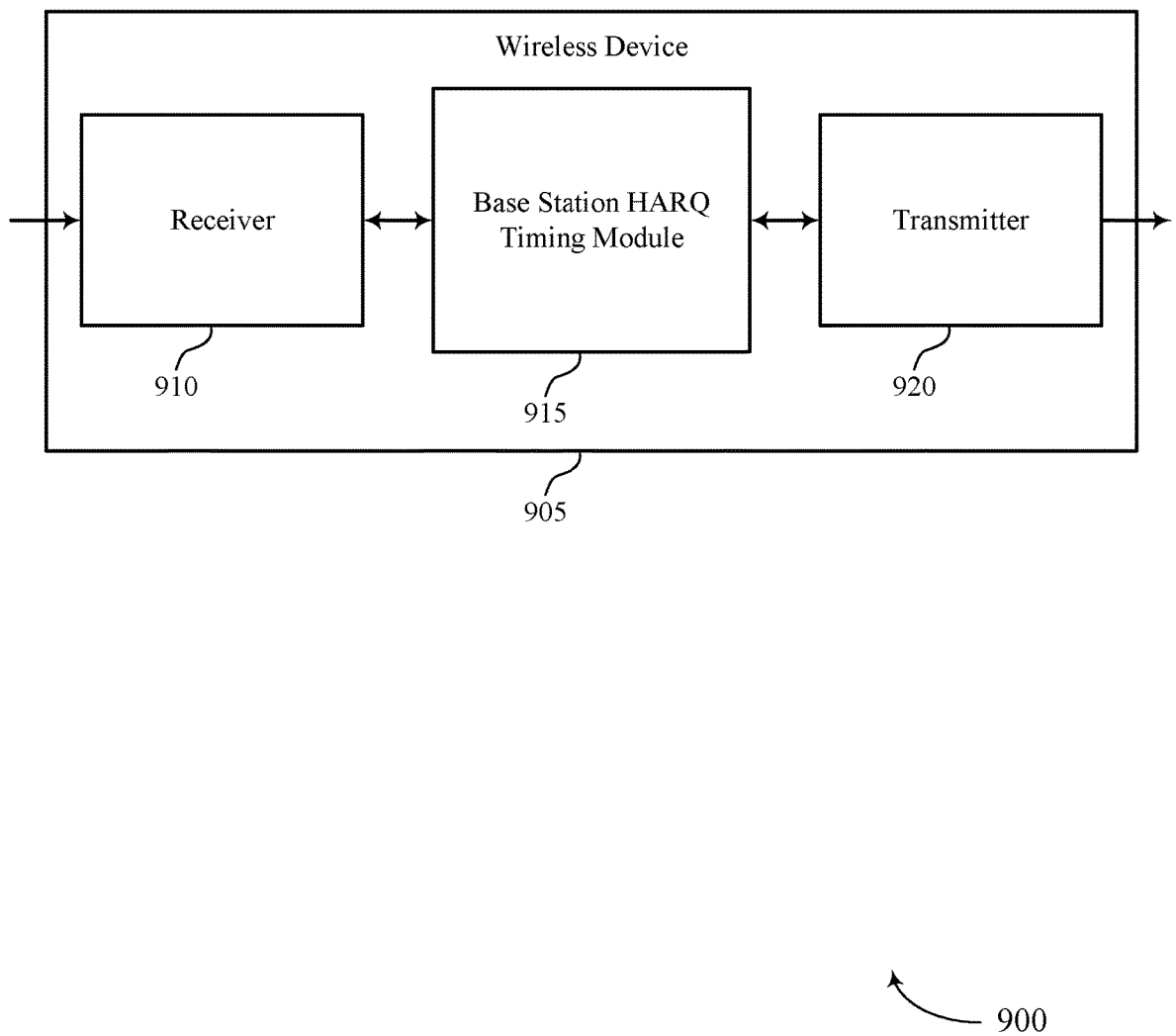
FIGS. 9 and 10 show block diagrams of a wireless device that supports carrier aggregation for downlink throughput enhancement in sTTI operation in accordance with aspects of the present disclosure.

FIG. 9 shows a block diagram 900 of a wireless device 905 that supports carrier aggregation for downlink throughput enhancement in sTTI operation in accordance with aspects of the present disclosure. Wireless device 905 may be an example of aspects of a base station 105 as described herein. Wireless device 905 may include receiver 910, base station HARQ timing module 915, and transmitter 920. Wireless device 905 may also include a processor. Each of these components may be in communication with one another (e.g., via one or more buses).

Receiver 910 may receive information such as packets, user data, or control information associated with various information channels (e.g., control channels, data channels, and information related to carrier aggregation for downlink throughput enhancement in sTTI operation, etc.). Information may be passed on to other components of the device. The receiver 910 may be an example of aspects of the transceiver 1235 described with reference to FIG. 12. The receiver 910 may utilize a single antenna or a set of antennas.

Base station HARQ timing module 915 may be an example of aspects of the base station HARQ timing module 1015, 1115, or 1215 described with reference to FIGS. 10 through 12. Base station HARQ timing module 915 and/or at least some of its various sub-components may be implemented in hardware, software executed by a processor, firmware, or any combination thereof. If implemented in software executed by a processor, the functions of the base station HARQ timing module 915 and/or at least some of its various sub-components may be executed by a general-purpose processor, a DSP, an ASIC, an FPGA or other programmable logic device, discrete gate or transistor logic, discrete hardware components, or any combination thereof designed to perform the functions described in the present disclosure. The base station HARQ timing module 915 and/or at least some of its various sub-components may be physically located at various positions, including being distributed such that portions of functions are implemented at different physical locations by one or more physical devices. In some examples, base station HARQ timing module 915 and/or at least some of its various sub-components may be a separate and distinct component in accordance with various aspects of the present disclosure. In other examples, base station HARQ timing module 915 and/or at least some of its various sub-components may be combined with one or more other hardware components, including but not limited to an I/O component, a transceiver, a network server, another computing device, one or more other components described in the present disclosure, or a combination thereof in accordance with various aspects of the present disclosure.

Base station HARQ timing module 915 may configure a first component carrier with a first TTI or sTTI for downlink transmissions and a second component carrier with a second sTTI for uplink transmissions, where the second sTTI is shorter than the first TTI or sTTI. Base station HARQ timing module 915 may further identify a HARQ timing for the first component carrier and associated with downlink transmissions based on the second sTTI configured for the second component carrier, perform a downlink transmission over the first component carrier using the first TTI or sTTI, and receive a downlink HARQ ACK/NACK message corresponding to (e.g., in response to) the downlink transmission according to the identified HARQ timing.

Transmitter 920 may transmit signals generated by other components of the device. In some examples, the transmitter 920 may be collocated with a receiver 910 in a transceiver module. For example, the transmitter 920 may be an example of aspects of the transceiver 1235 described with reference to FIG. 12. The transmitter 920 may utilize a single antenna or a set of antennas.

Figure 10:
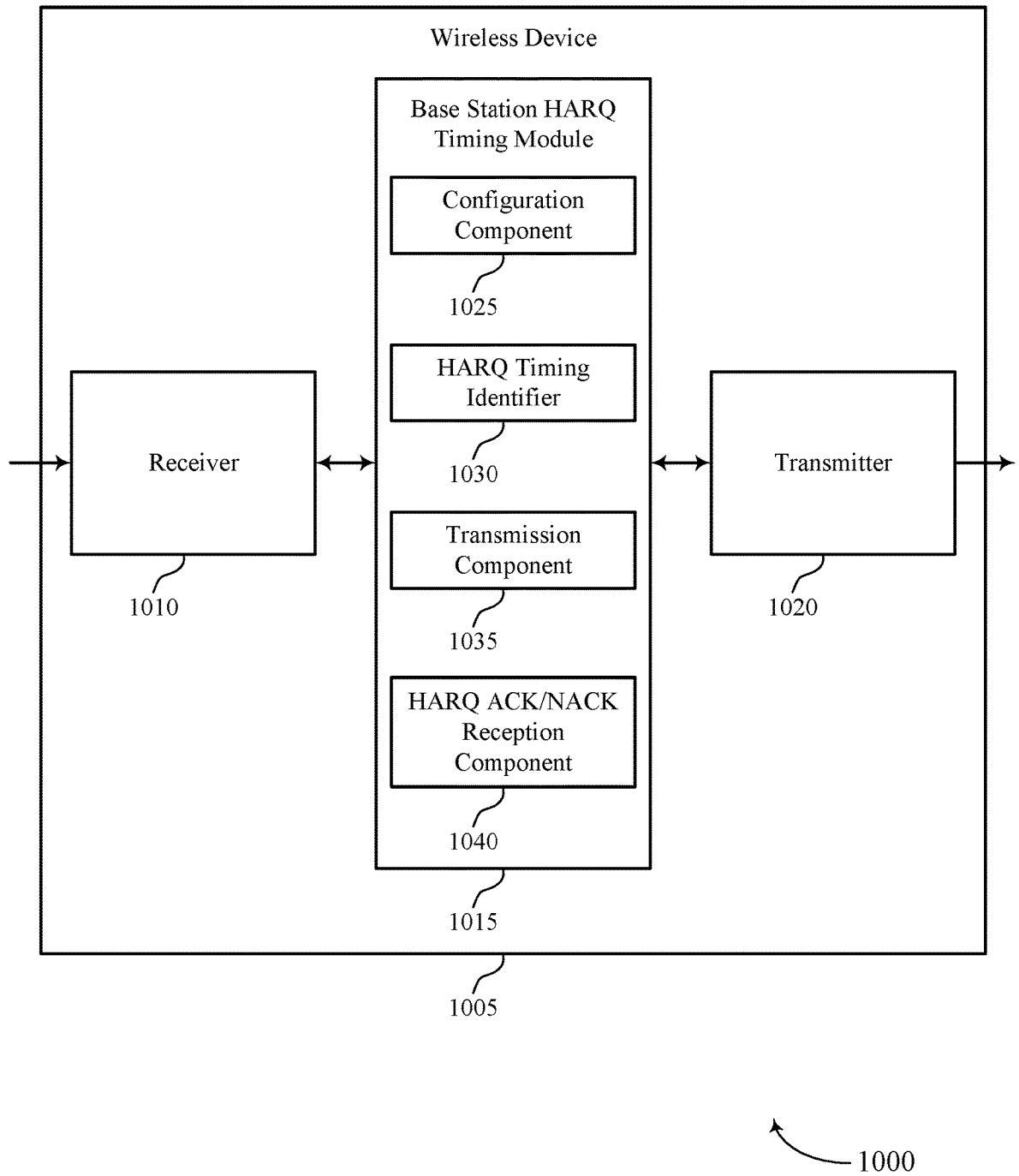

FIG. 10 shows a block diagram 1000 of a wireless device 1005 that supports carrier aggregation for downlink throughput enhancement in sTTI operation in accordance with aspects of the present disclosure. Wireless device 1005 may be an example of aspects of a wireless device 905 or a base station 105 as described with reference to FIGS. 1 through 4 and 9. Wireless device 1005 may include receiver 1010, base station HARQ timing module 1015, and transmitter 1020. Wireless device 1005 may also include a processor. Each of these components may be in communication with one another (e.g., via one or more buses).

Receiver 1010 may receive information such as packets, user data, or control information associated with various information channels (e.g., control channels, data channels, and information related to carrier aggregation for downlink throughput enhancement in sTTI operation, etc.). Information may be passed on to other components of the device. The receiver 1010 may be an example of aspects of the transceiver 1235 described with reference to FIG. 12. The receiver 1010 may utilize a single antenna or a set of antennas.

Base station HARQ timing module 1015 may be an example of aspects of the base station HARQ timing module 915, 1115, or 1215 described with reference to FIGS. 9, 11, and 12. Base station HARQ timing module 1015 may also include configuration component 1025, HARQ timing identifier 1030, transmission component 1035, and HARQ ACK/NACK reception component 1040.

Configuration component 1025 may configure a first component carrier with a first TTI or sTTI for downlink transmissions and a second component carrier with a second sTTI for uplink transmissions, where the second sTTI is shorter than the first TTI or sTTI. HARQ timing identifier 1030 may identify a HARQ timing for the first component carrier and associated with downlink transmissions based on the second sTTI configured for the second component carrier.

Transmission component 1035 may perform a downlink transmission over the first component carrier using the first TTI or sTTI. In some cases, transmission component 1035 may be a component or aspect of the transmitter 1020. HARQ ACK/NACK reception component 1040 may receive a downlink HARQ ACK/NACK message corresponding to the downlink transmission according to the identified HARQ timing. In some cases, the downlink HARQ ACK/NACK message is received over the second component carrier using the second sTTI. The HARQ ACK/NACK reception component 1040 may be a component or aspect of the receiver 1010.

Transmitter 1020 may transmit signals generated by other components of the device. In some examples, the transmitter 1020 may be collocated with a receiver 1010 in a transceiver module. For example, the transmitter 1020 may be an example of aspects of the transceiver 1235 described with reference to FIG. 12. The transmitter 1020 may utilize a single antenna or a set of antennas.

Figure 11:
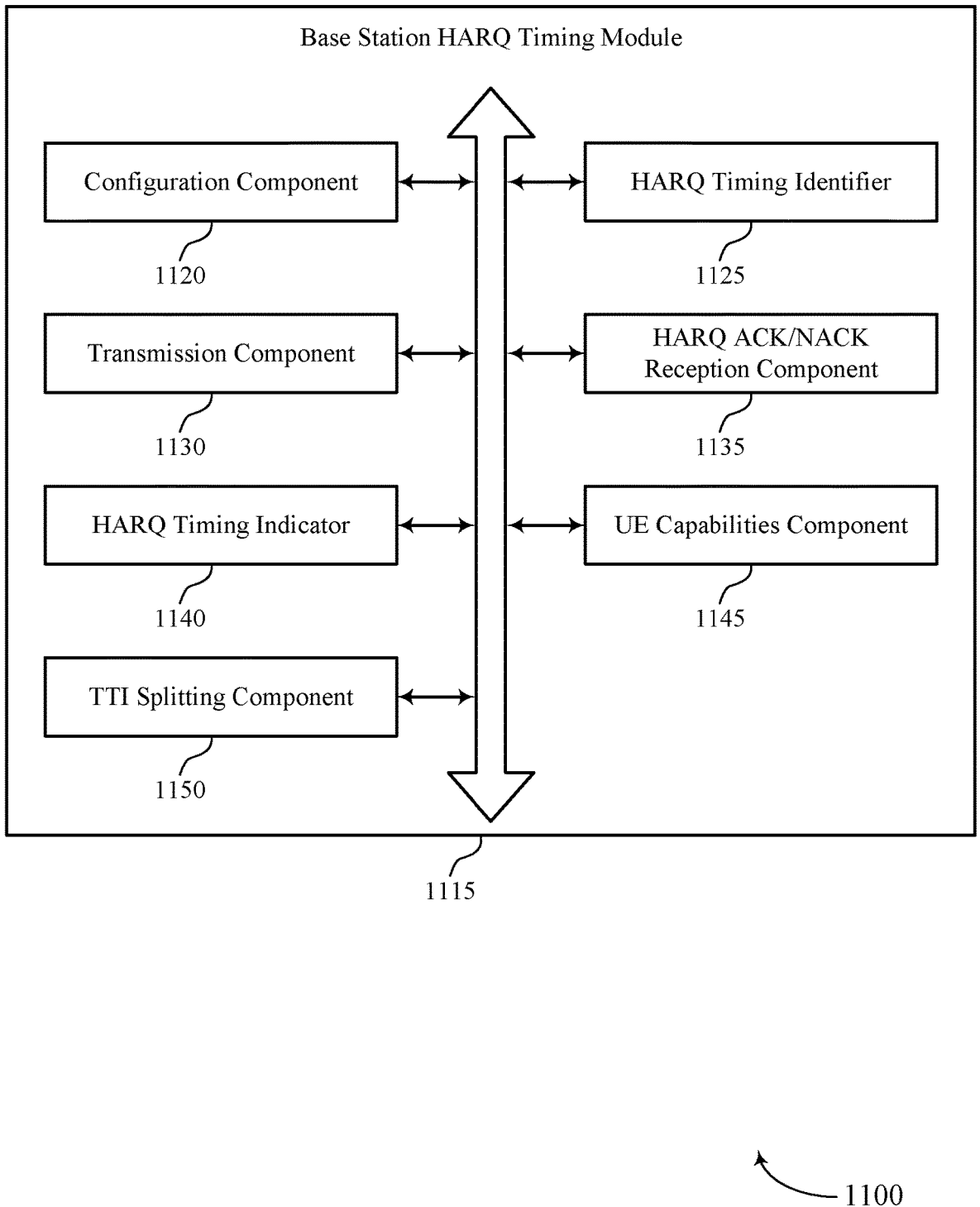
FIG. 11 shows a block diagram of a base station HARQ timing module that supports carrier aggregation for downlink throughput enhancement in sTTI operation in accordance with aspects of the present disclosure.

FIG. 11 shows a block diagram 1100 of a base station HARQ timing module 1115 that supports carrier aggregation for downlink throughput enhancement in sTTI operation in accordance with aspects of the present disclosure. The base station HARQ timing module 1115 may be an example of aspects of a base station HARQ timing module 915, 1015, or 1215 described with reference to FIGS. 9, 10, and 12. The base station HARQ timing module 1115 may include configuration component 1120, HARQ timing identifier 1125, transmission component 1130, HARQ ACK/NACK reception component 1135, HARQ timing indicator 1140, UE capabilities component 1145, and TTI splitting component 1150. Each of these modules may communicate, directly or indirectly, with one another (e.g., via one or more buses).

Configuration component 1120 may configure a first component carrier with a first TTI or sTTI for downlink transmissions and a second component carrier with a second sTTI for uplink transmissions, where the second sTTI is shorter than the first TTI or sTTI. In some cases, configuration component 1120 may configure the first component carrier in a TDD mode, an LAA mode, an eLAA mode, or a combination thereof, and may configure the first component carrier or the second component carrier in an FDD mode. In some cases, the first component carrier and the second component carrier correspond to a same PUCCH group. The first TTI or sTTI may be an sTTI spanning seven OFDM symbols or fourteen OFDM symbols. TTI splitting component 1150 may split the TTI into two slots, where a downlink transmission is performed over each of the two slots. In some cases, the second sTTI spans two or three OFDM symbols. In some cases, the first component carrier may be an example of an SCell component carrier and the second component carrier may be an example of a PCell or PSCell component carrier.

HARQ timing identifier 1125 may identify a HARQ timing for the first component carrier and associated with downlink transmissions based on the second sTTI configured for the second component carrier.

Transmission component 1130 may perform a downlink transmission over the first component carrier using the first TTI or sTTI. HARQ ACK/NACK reception component 1135 may receive a downlink HARQ ACK/NACK message corresponding to the downlink transmission according to the identified HARQ timing. In some cases, the downlink HARQ ACK/NACK message is received over the second component carrier using the second sTTI.

HARQ timing indicator 1140 may transmit an indication of the HARQ timing over the first component carrier. UE capabilities component 1145 may identify one or more UE capabilities of a UE, where identifying the HARQ timing is further based on the one or more UE capabilities of the UE. In some cases, the one or more UE capabilities include a TBS, a number of layers, a reference signal type, a PDCCH transmission duration, an sTTI PDCCH transmission duration, a number of blind decodes, a search space size for the PDCCH or the sTTI PDCCH, or a combination thereof. In some cases, identifying the one or more UE capabilities may include receiving an indication of the one or more UE capabilities. In some cases, the one or more UE capabilities of the UE may correspond to a UE 115 transmitting the downlink HARQ ACK/NACK message (e.g., the UE 115 attempting to receive the downlink transmission). In these cases, the one or more UE capabilities may be based on a number of component carriers configured with the first TTI or sTTI, a total number of component carriers configured for the UE, or a combination thereof.

Figure 12:
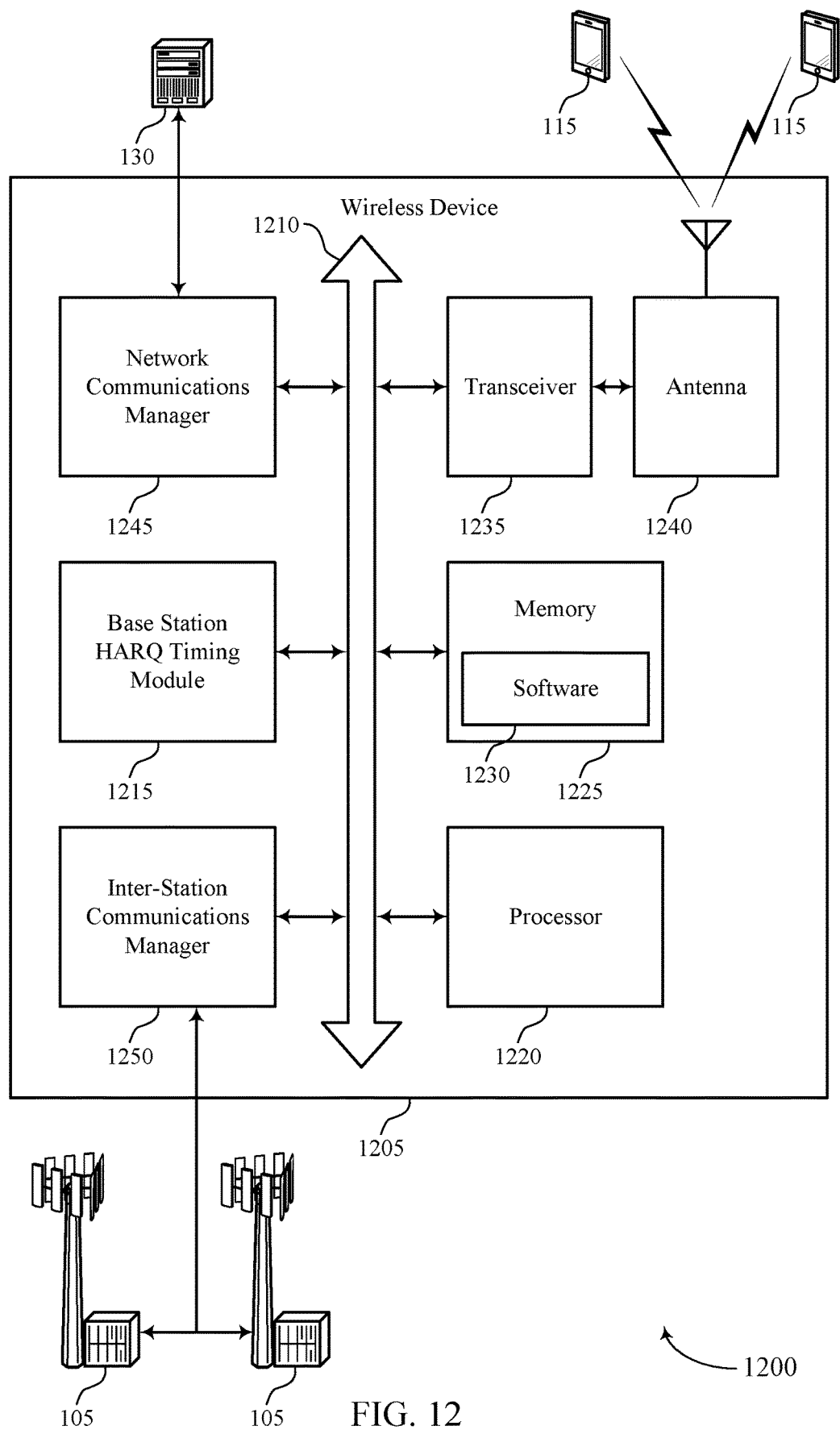
FIG. 12 shows a diagram of a system including a wireless device that supports carrier aggregation for downlink throughput enhancement in sTTI operation in accordance with aspects of the present disclosure.

FIG. 12 shows a diagram of a system 1200 including a wireless device 1205 that supports carrier aggregation for downlink throughput enhancement in sTTI operation in accordance with aspects of the present disclosure. Wireless device 1205 may be an example of or include the components of a wireless device 905, a wireless device 1005, or a base station 105 as described above, e.g., with reference to FIGS. 1 through 4, 9, and 10. Wireless device 1205 may include components for bi-directional voice and data communications including components for transmitting and receiving communications, including base station HARQ timing module 1215, processor 1220, memory 1225, software 1230, transceiver 1235, antenna 1240, network communications manager 1245, and inter-station communications manager 1250. These components may be in electronic communication via one or more buses (e.g., bus 1210). Wireless device 1205 may communicate wirelessly with one or more UEs 115, one or more base stations 105, or a combination of these devices.

Processor 1220 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, processor 1220 may be configured to operate a memory array using a memory controller. In other cases, a memory controller may be integrated into processor 1220. Processor 1220 may be configured to execute computer-readable instructions stored in a memory to perform various functions (e.g., functions or tasks supporting carrier aggregation for downlink throughput enhancement in sTTI operation), for example, functions with reference to FIG. 16. In one implementation, for example, the processor may retrieve instructions stored in the memory 1225 and executable by the processor 1220 to cause the apparatus to perform the various functions with reference to FIG. 16. In one example, the processor 1220 causing the apparatus to perform the functions may include the processor causing the transceiver 1235 to perform one or more of the functions.

Memory 1225 may include RAM and ROM. The memory 1225 may store computer-readable, computer-executable software 1230 including instructions that, when executed, cause the processor to perform various functions described herein. In some cases, the memory 1225 may contain, among other things, a BIOS which may control basic hardware or software operation such as the interaction with peripheral components or devices.

Software 1230 may include code to implement aspects of the present disclosure, including code to support carrier aggregation for downlink throughput enhancement in sTTI operation. Software 1230 may be stored in a non-transitory computer-readable medium such as system memory or other memory. In some cases, the software 1230 may not be directly executable by the processor but may cause a computer (e.g., when compiled and executed) to perform functions described herein.

Transceiver 1235 may communicate bi-directionally, via one or more antennas, wired, or wireless links as described above. For example, the transceiver 1235 may represent a wireless transceiver and may communicate bi-directionally with another wireless transceiver. The transceiver 1235 may also include a modem to modulate the packets and provide the modulated packets to the antennas for transmission, and to demodulate packets received from the antennas.

In some cases, the wireless device may include a single antenna 1240. However, in some cases the device may have more than one antenna 1240, which may be capable of concurrently transmitting or receiving multiple wireless transmissions.

Network communications manager 1245 may manage communications with the core network 130 (e.g., via one or more wired backhaul links). For example, the network communications manager 1245 may manage the transfer of data communications for client devices, such as one or more UEs 115.

Inter-station communications manager 1250 may manage communications with other base station 105 and may include a controller or scheduler for controlling communications with UEs 115 in cooperation with other base stations 105. For example, the inter-station communications manager 1250 may coordinate scheduling for transmissions to UEs 115 for various interference mitigation techniques such as beamforming or joint transmission. In some examples, inter-station communications manager 1250 may provide an X2 interface within an LTE/LTE-A wireless communication network technology to provide communication between base stations 105.

Figure 13:
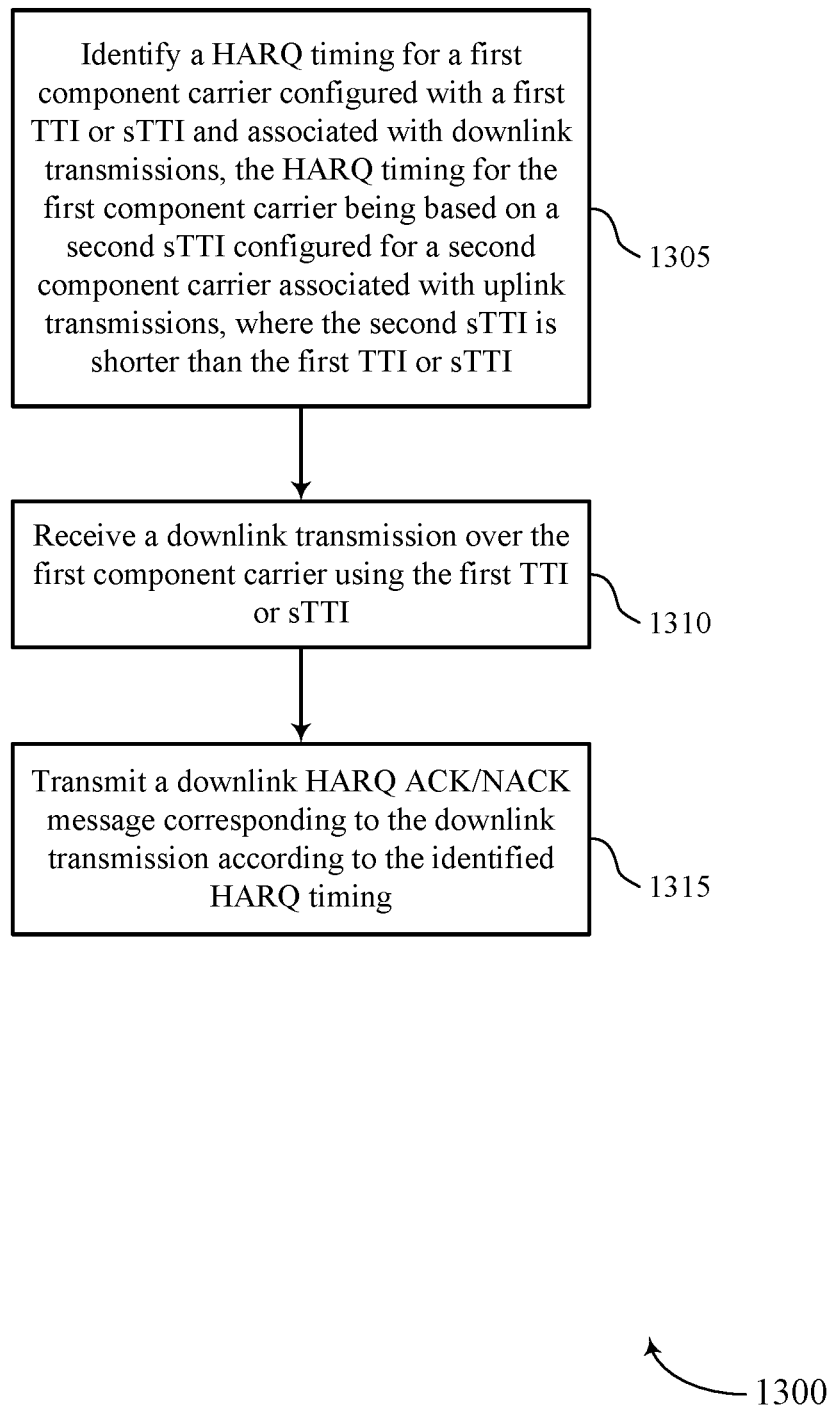
FIGS. 13 through 16 show flowcharts illustrating methods for carrier aggregation for downlink throughput enhancement in sTTI operation in accordance with aspects of the present disclosure.

FIG. 13 shows a flowchart illustrating a method 1300 for carrier aggregation for downlink throughput enhancement in sTTI operation in accordance with aspects of the present disclosure. The operations of method 1300 may be implemented by a UE 115 or its components as described herein. For example, the operations of method 1300 may be performed by a UE HARQ timing module as described with reference to FIGS. 5 through 8. In some examples, a UE 115 may execute a set of codes to control the functional elements of the device to perform the functions described below. Additionally or alternatively, the UE 115 may perform aspects of the functions described below using special-purpose hardware.

At 1305 the UE 115 may identify a HARQ timing for a first component carrier configured with a first TTI or sTTI and associated with downlink transmissions. The HARQ timing for the first component carrier may be based at least in part on a second sTTI configured for a second component carrier associated with uplink transmissions, where the second sTTI is shorter than the first TTI or sTTI. In other words, whichever TTI of the first TTI or the first sTTI is associated with the configuration of the first component carrier for the identified HARQ timing, the second sTTI is shorter than that TTI. The operations of 1305 may be performed according to the methods described herein. In certain examples, aspects of the operations of 1305 may be performed by a HARQ timing identifier as described with reference to FIGS. 5 through 8.

At 1310 the UE 115 may receive a downlink transmission over the first component carrier using the first TTI or sTTI. In other words, whichever TTI of the first TTI or the first sTTI is associated with the configuration of the first component carrier for the identified HARQ timing, the UE 115 may receive a downlink transmission over the first component carrier using that TTI. The operations of 1310 may be performed according to the methods described herein. In certain examples, aspects of the operations of 1310 may be performed by a reception component as described with reference to FIGS. 5 through 8.

At 1315 the UE 115 may transmit a downlink HARQ ACK/NACK message corresponding to the downlink transmission according to the identified HARQ timing. The operations of 1315 may be performed according to the methods described herein. In certain examples, aspects of the operations of 1315 may be performed by a HARQ transmission component as described with reference to FIGS. 5 through 8.

Figure 14:
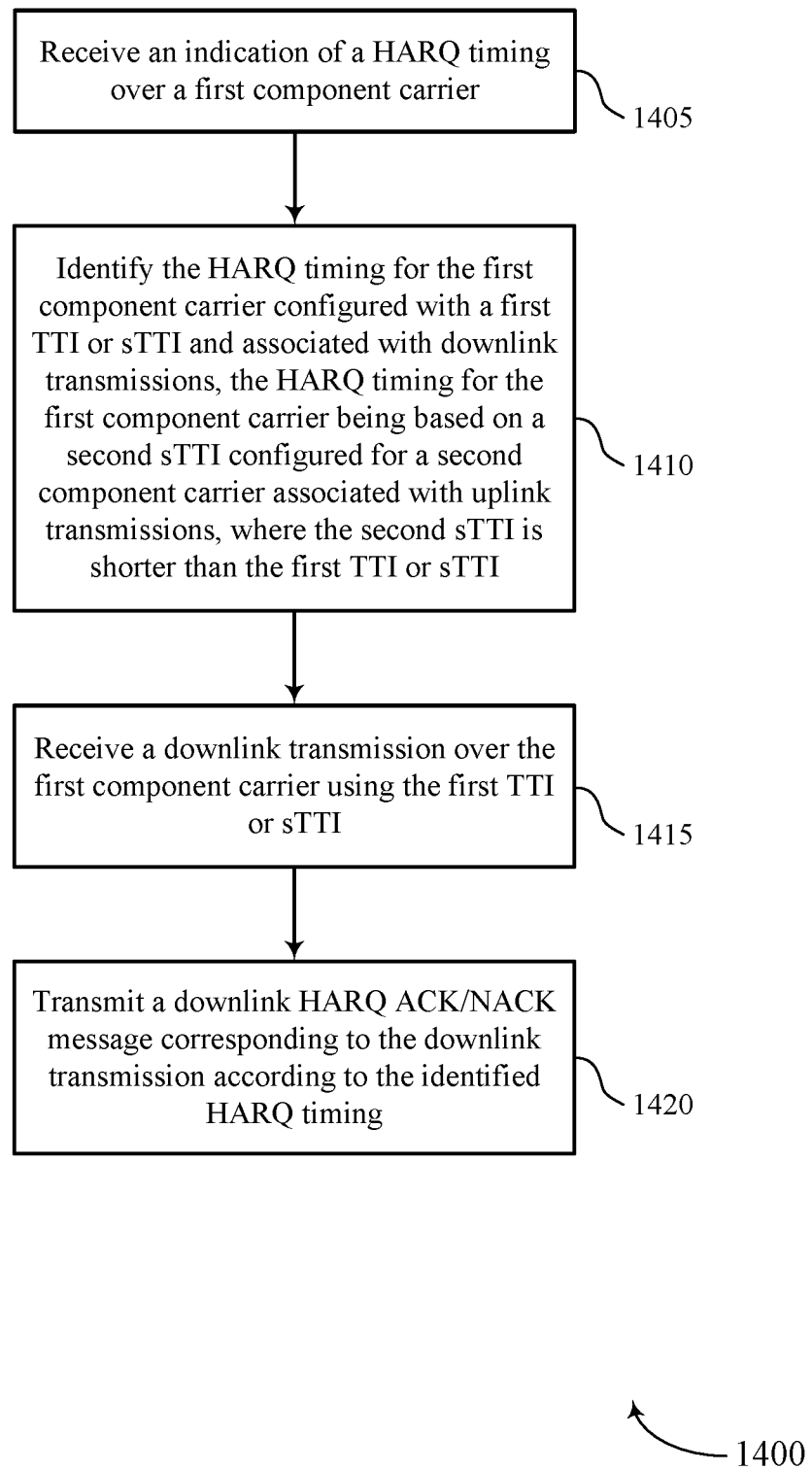

FIG. 14 shows a flowchart illustrating a method 1400 for carrier aggregation for downlink throughput enhancement in sTTI operation in accordance with aspects of the present disclosure. The operations of method 1400 may be implemented by a UE 115 or its components as described herein. For example, the operations of method 1400 may be performed by a UE HARQ timing module as described with reference to FIGS. 5 through 8. In some examples, a UE 115 may execute a set of codes to control the functional elements of the device to perform the functions described below. Additionally or alternatively, the UE 115 may perform aspects of the functions described below using special-purpose hardware.

At 1405 the UE 115 may receive an indication of a HARQ timing over a first component carrier. In some cases, this indication may be a component of DCI. The operations of 1405 may be performed according to the methods described herein. In certain examples, aspects of the operations of 1405 may be performed by a HARQ timing identifier as described with reference to FIGS. 5 through 8.

At 1410 the UE 115 may identify the HARQ timing for the first component carrier configured with a first TTI or sTTI and associated with downlink transmissions. The HARQ timing for the first component carrier may be based at least in part on a second sTTI configured for a second component carrier associated with uplink transmissions, where the second sTTI is shorter than the first TTI or sTTI. In other words, whichever TTI of the first TTI or the first sTTI is associated with the configuration of the first component carrier for the identified HARQ timing, the second sTTI is shorter than that TTI. The operations of 1410 may be performed according to the methods described herein. In certain examples, aspects of the operations of 1410 may be performed by a HARQ timing identifier as described with reference to FIGS. 5 through 8.

At 1415 the UE 115 may receive a downlink transmission over the first component carrier using the first TTI or sTTI. In other words, whichever TTI of the first TTI or the first sTTI is associated with the configuration of the first component carrier for the identified HARQ timing, the UE 115 may receive a downlink transmission over the first component carrier using that TTI. The operations of 1415 may be performed according to the methods described herein. In certain examples, aspects of the operations of 1415 may be performed by a reception component as described with reference to FIGS. 5 through 8.

At 1420 the UE 115 may transmit a downlink HARQ ACK/NACK message corresponding to the downlink transmission according to the identified HARQ timing. The operations of 1420 may be performed according to the methods described herein. In certain examples, aspects of the operations of 1420 may be performed by a HARQ transmission component as described with reference to FIGS. 5 through 8.

Figure 15:
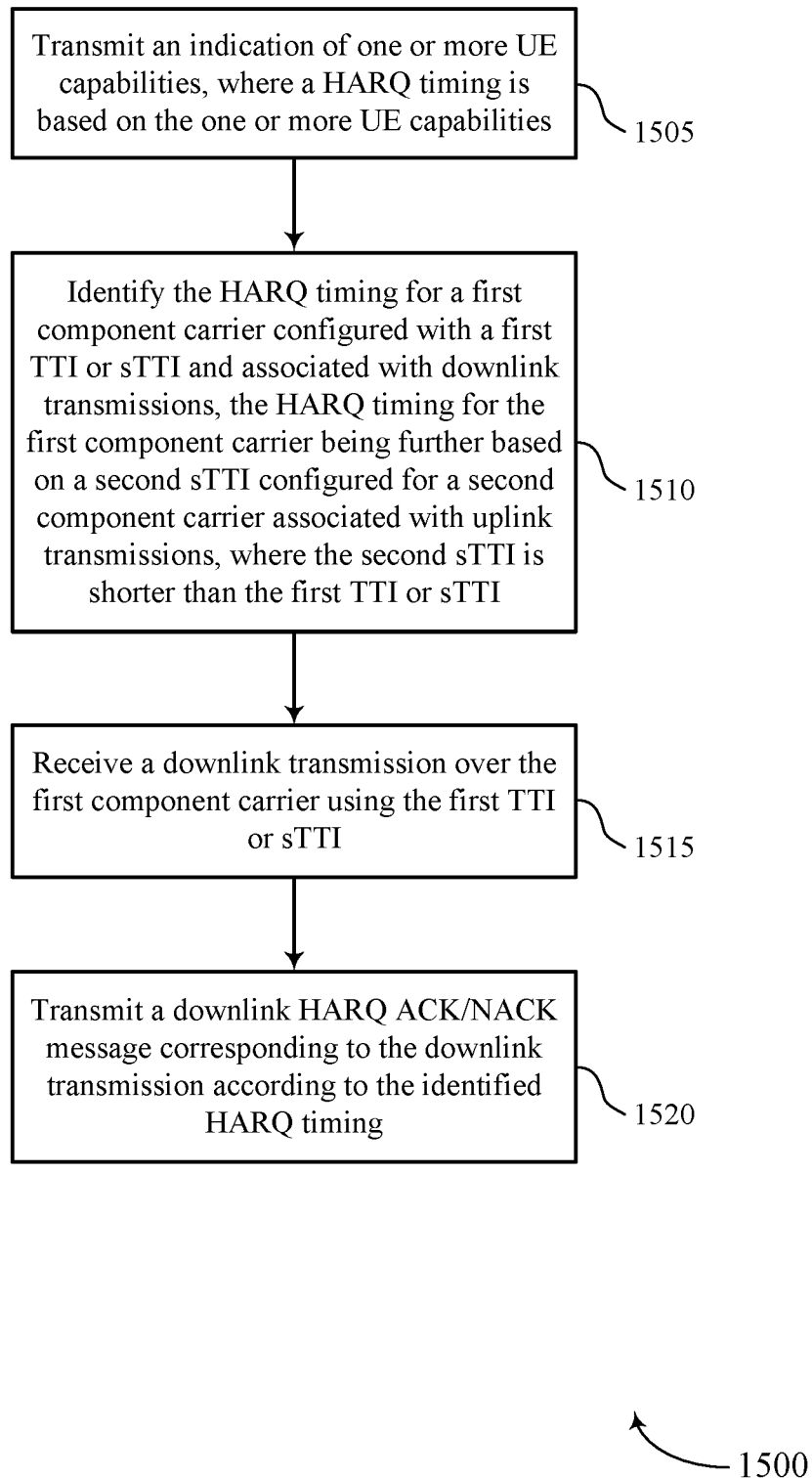

FIG. 15 shows a flowchart illustrating a method 1500 for carrier aggregation for downlink throughput enhancement in sTTI operation in accordance with aspects of the present disclosure. The operations of method 1500 may be implemented by a UE 115 or its components as described herein. For example, the operations of method 1500 may be performed by a UE HARQ timing module as described with reference to FIGS. 5 through 8. In some examples, a UE 115 may execute a set of codes to control the functional elements of the device to perform the functions described below. Additionally or alternatively, the UE 115 may perform aspects of the functions described below using special-purpose hardware.

At 1505 the UE 115 may transmit an indication of one or more UE capabilities, where a HARQ timing is based at least in part on the one or more UE capabilities. The operations of 1505 may be performed according to the methods described herein. In certain examples, aspects of the operations of 1505 may be performed by a UE capabilities component as described with reference to FIGS. 5 through 8.

At 1510 the UE 115 may identify the HARQ timing for a first component carrier configured with a first TTI or sTTI and associated with downlink transmissions. The HARQ timing for the first component carrier may be based at least in part on the UE capabilities and a second sTTI configured for a second component carrier associated with uplink transmissions, where the second sTTI is shorter than the first TTI or sTTI. In other words, whichever TTI of the first TTI or the first sTTI is associated with the configuration of the first component carrier for the identified HARQ timing, the second sTTI is shorter than that TTI. The operations of 1510 may be performed according to the methods described herein. In certain examples, aspects of the operations of 1510 may be performed by a HARQ timing identifier as described with reference to FIGS. 5 through 8.

At 1515 the UE 115 may receive a downlink transmission over the first component carrier using the first TTI or sTTI. In other words, whichever TTI of the first TTI or the first sTTI is associated with the configuration of the first component carrier for the identified HARQ timing, the UE 115 may receive a downlink transmission over the first component carrier using that TTI. The operations of 1515 may be performed according to the methods described herein. In certain examples, aspects of the operations of 1515 may be performed by a reception component as described with reference to FIGS. 5 through 8.

At 1520 the UE 115 may transmit a downlink HARQ ACK/NACK message corresponding to the downlink transmission according to the identified HARQ timing. The operations of 1520 may be performed according to the methods described herein. In certain examples, aspects of the operations of 1520 may be performed by a HARQ transmission component as described with reference to FIGS. 5 through 8.

Figure 16:
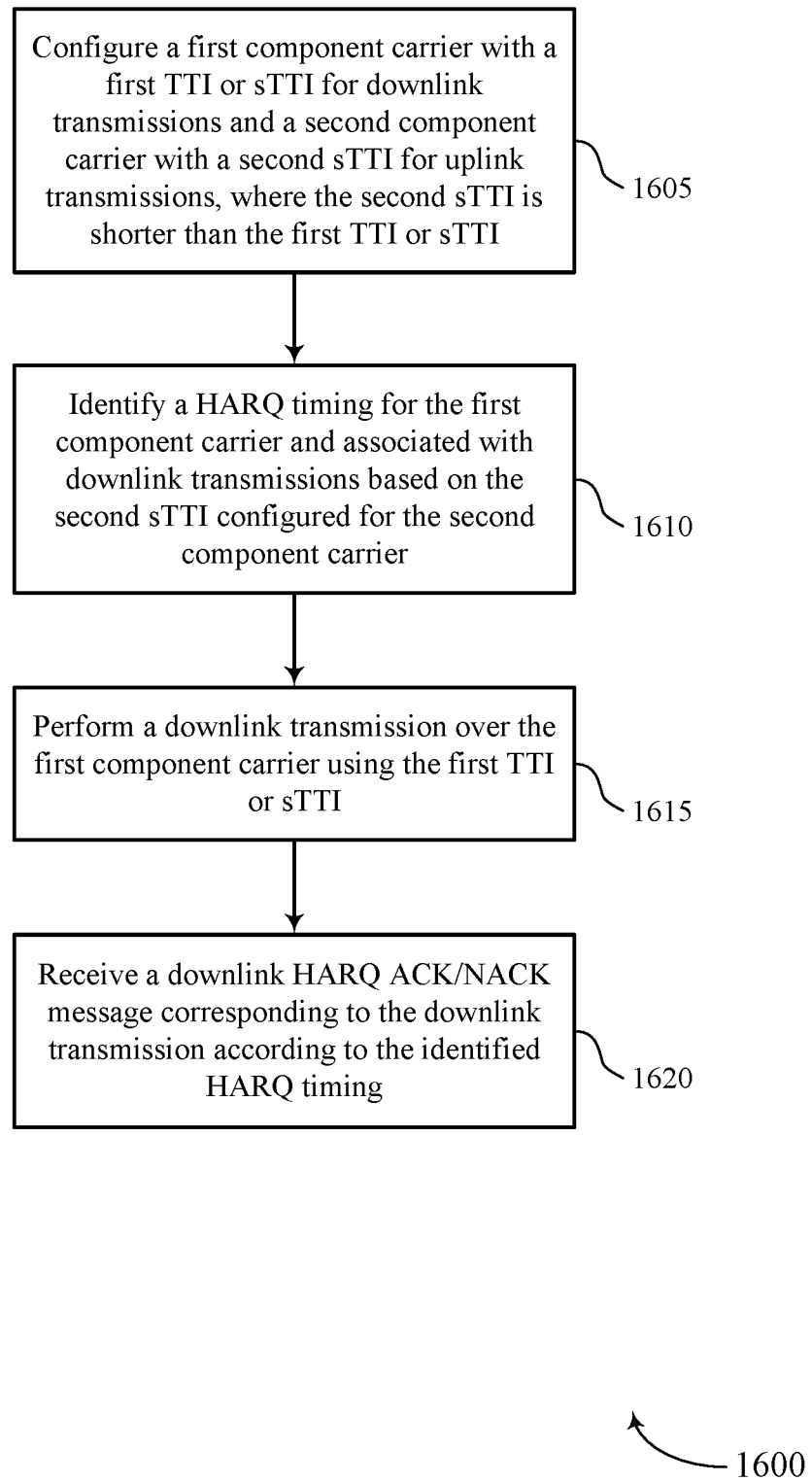

FIG. 16 shows a flowchart illustrating a method 1600 for carrier aggregation for downlink throughput enhancement in sTTI operation in accordance with aspects of the present disclosure. The operations of method 1600 may be implemented by a base station 105 or its components as described herein. For example, the operations of method 1600 may be performed by a base station HARQ timing module as described with reference to FIGS. 9 through 12. In some examples, a base station 105 may execute a set of codes to control the functional elements of the device to perform the functions described below. Additionally or alternatively, the base station 105 may perform aspects of the functions described below using special-purpose hardware.

At 1605 the base station 105 may configure a first component carrier with a first TTI or sTTI for downlink transmissions and a second component carrier with a second sTTI for uplink transmissions, where the second sTTI is shorter than the first TTI or sTTI. In other words, whichever TTI of the first TTI or the first sTTI was configured for the first component carrier by the base station 105, the second sTTI configured for the second component carrier may be shorter in length than that TTI. The operations of 1605 may be performed according to the methods described herein. In certain examples, aspects of the operations of 1605 may be performed by a configuration component as described with reference to FIGS. 9 through 12.

At 1610 the base station 105 may identify a HARQ timing for the first component carrier and associated with downlink transmissions based at least in part on the second sTTI configured for the second component carrier. The operations of 1610 may be performed according to the methods described herein. In certain examples, aspects of the operations of 1610 may be performed by a HARQ timing identifier as described with reference to FIGS. 9 through 12.

At 1615 the base station 105 may perform a downlink transmission over the first component carrier using the first TTI or sTTI. In other words, whichever TTI of the first TTI or the first sTTI was configured for the first component carrier by the base station 105, the base station 105 may perform a downlink transmission over the first carrier using that TTI. The operations of 1615 may be performed according to the methods described herein. In certain examples, aspects of the operations of 1615 may be performed by a transmission component as described with reference to FIGS. 9 through 12.

At 1620 the base station 105 may receive a downlink HARQ ACK/NACK message corresponding to the downlink transmission according to the identified HARQ timing. The operations of 1620 may be performed according to the methods described herein. In certain examples, aspects of the operations of 1620 may be performed by a HARQ ACK/NACK reception component as described with reference to FIGS. 9 through 12.

It should be noted that the methods described above describe possible implementations, and that the operations and the steps may be rearranged or otherwise modified and that other implementations are possible. Further, aspects from two or more of the methods may be combined.

Techniques described herein may be used for various wireless communications systems such as code division multiple access (CDMA), time division multiple access (TDMA), frequency division multiple access (FDMA), orthogonal frequency division multiple access (OFDMA), single carrier frequency division multiple access (SC-FDMA), and other systems. A CDMA system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM).

An OFDMA system may implement a radio technology such as Ultra Mobile Broadband (UMB), E-UTRA, Institute of Electrical and Electronics Engineers (IEEE) 802.11 (Wi-Fi), IEEE 802.16 (WiMAX), IEEE 802.20, Flash-OFDM, etc. UTRA and E-UTRA are part of Universal Mobile Telecommunications System (UMTS). LTE, LTE-A, and LTE-A Pro are releases of UMTS that use E-UTRA. UTRA, E-UTRA, UMTS, LTE, LTE-A, LTE-A Pro, NR, and GSM are described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies. While aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR applications.

A macro cell generally covers a relatively large geographic area (e.g., several kilometers in radius) and may allow unrestricted access by UEs 115 with service subscriptions with the network provider. A small cell may be associated with a lower-powered base station 105, as compared with a macro cell, and a small cell may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs 115 with service subscriptions with the network provider. A femto cell may also cover a small geographic area (e.g., a home) and may provide restricted access by UEs 115 having an association with the femto cell (e.g., UEs 115 in a closed subscriber group (CSG), UEs 115 for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells, and may also support communications using one or multiple component carriers.

The wireless communications system 100 or systems described herein may support synchronous or asynchronous operation. For synchronous operation, the base stations 105 may have similar frame timing, and transmissions from different base stations 105 may be approximately aligned in time. For asynchronous operation, the base stations 105 may have different frame timing, and transmissions from different base stations 105 may not be aligned in time. The techniques described herein may be used for either synchronous or asynchronous operations.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device (PLD), discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communication, comprising:
identifying a hybrid automatic repeat request (HARQ) timing for a first component carrier configured with a first transmission time interval (TTI) or shortened TTI (sTTI) and associated with downlink transmissions, wherein the HARQ timing for the first component carrier corresponds to a second sTTI configured for a second component carrier associated with uplink transmissions, and wherein the second sTTI is shorter than the first TTI or sTTI;
receiving a downlink transmission over the first component carrier using the first TTI or sTTI; and
transmitting a downlink HARQ positive or negative acknowledgment (ACK/NACK) message corresponding to the downlink transmission according to the identified HARQ timing.

2. The method of claim 1, wherein identifying the HARQ timing for the first component carrier comprises:
receiving an indication of the HARQ timing over the first component carrier.

3. The method of claim 1, further comprising:
transmitting an indication of one or more user equipment (UE) capabilities, wherein the HARQ timing is further based at least in part on the one or more UE capabilities.

4. The method of claim 3, wherein the one or more UE capabilities comprise a transport block size (TBS), a number of layers, a reference signal type, a physical downlink control channel (PDCCH) transmission duration, an sTTI PDCCH transmission duration, a number of blind decodes, a search space size for the PDCCH or the sTTI PDCCH, or a combination thereof.

5. The method of claim 3, wherein the one or more UE capabilities correspond to a UE transmitting the downlink HARQ ACK/NACK message, the method further comprising:
determining a number of component carriers configured with the first TTI or sTTI, a total number of component carriers configured for the UE, or a combination thereof, wherein the indication of the one or more UE capabilities is based at least in part on the number of component carriers configured with the first TTI or sTTI, the total number of component carriers configured for the UE, or the combination thereof.

6. The method of claim 3, further comprising:
determining a maximum timing advance (TA) based at least in part on the second sTTI, the one or more UE capabilities, or a combination thereof.

7. The method of claim 1, wherein the downlink HARQ ACK/NACK message is transmitted over the second component carrier using the second sTTI.

8. The method of claim 1, wherein the first component carrier and the second component carrier correspond to a same PUCCH group.

9. The method of claim 1, wherein the first component carrier is configured in a time division duplex (TDD) mode, a licensed assisted access (LAA) mode, an enhanced LAA (eLAA) mode, or a combination thereof.

10. The method of claim 1, wherein the first component carrier or the second component carrier is configured in a frequency division duplex (FDD) mode.

11. The method of claim 1, wherein the first TTI or sTTI comprises an sTTI spanning seven orthogonal frequency division multiplexing (OFDM) symbols.

12. The method of claim 1, wherein the first TTI or sTTI comprises a TTI spanning fourteen orthogonal frequency division multiplexing (OFDM) symbols.

13. The method of claim 12, wherein the TTI is split into two slots, and the downlink transmission is received over each of the two slots.

14. The method of claim 1, wherein the second sTTI spans two or three orthogonal frequency division multiplexing (OFDM) symbols.

15. The method of claim 1, wherein:
the first component carrier comprises a secondary cell (SCell) component carrier; and
the second component carrier comprises a primary cell (PCell) component carrier or a physical uplink control channel SCell (PSCell) component carrier.

16. A method for wireless communication, comprising:
configuring a first component carrier with a first transmission time interval (TTI) or shortened TTI (sTTI) for downlink transmissions and a second component carrier with a second sTTI for uplink transmissions, wherein the second sTTI is shorter than the first TTI or sTTI;
identifying a hybrid automatic repeat request (HARQ) timing for the first component carrier and associated with downlink transmissions, wherein the HARQ timing for the first component carrier corresponds to the second sTTI configured for the second component carrier;
performing a downlink transmission over the first component carrier using the first TTI or sTTI; and
receiving a downlink HARQ positive or negative acknowledgment (ACK/NACK) message corresponding to the downlink transmission according to the identified HARQ timing.

17. The method of claim 16, further comprising:
transmitting an indication of the HARQ timing over the first component carrier.

18. The method of claim 16, further comprising:
identifying one or more user equipment (UE) capabilities, wherein identifying the HARQ timing is further based at least in part on the one or more UE capabilities.

19. The method of claim 18, wherein the one or more UE capabilities comprise a transport block size (TBS), a number of layers, a reference signal type, a physical downlink control channel (PDCCH) transmission duration, an sTTI PDCCH transmission duration, a number of blind decodes, a search space size for the PDCCH or the sTTI PDCCH, or a combination thereof.

20. The method of claim 18, wherein:
the one or more UE capabilities correspond to a UE transmitting the downlink HARQ ACK/NACK message; and
the one or more UE capabilities are based at least in part on a number of component carriers configured with the first TTI or sTTI, a total number of component carriers configured for the UE, or a combination thereof.

21. The method of claim 18, wherein identifying the one or more UE capabilities comprises:
receiving an indication of the one or more UE capabilities.

22. The method of claim 16, wherein the downlink HARQ ACK/NACK message is received over the second component carrier using the second sTTI.

23. The method of claim 16, wherein the first component carrier and the second component carrier correspond to a same PUCCH group.

24. The method of claim 16, further comprising:
configuring the first component carrier in a time division duplex (TDD) mode, a licensed assisted access (LAA) mode, an enhanced LAA (eLAA) mode, or a combination thereof.

25. The method of claim 16, further comprising:
configuring the first component carrier or the second component carrier in a frequency division duplex (FDD) mode.

26. The method of claim 16, wherein the first TTI or sTTI comprises an sTTI spanning seven orthogonal frequency division multiplexing (OFDM) symbols.

27. The method of claim 16, wherein the first TTI or sTTI comprises a TTI spanning fourteen orthogonal frequency division multiplexing (OFDM) symbols.

28. The method of claim 27, further comprising:
splitting the TTI into two slots, wherein the downlink transmission is performed over each of the two slots.

29. The method of claim 16, wherein the second sTTI spans two or three orthogonal frequency division multiplexing (OFDM) symbols.

30. The method of claim 16, wherein:
the first component carrier comprises a secondary cell (SCell) component carrier; and
the second component carrier comprises a primary cell (PCell) component carrier or a physical uplink control channel SCell (PSCell) component carrier.

31. An apparatus for wireless communication, comprising:
means for identifying a hybrid automatic repeat request (HARQ) timing for a first component carrier configured with a first transmission time interval (TTI) or shortened TTI (sTTI) and associated with downlink transmissions, wherein the HARQ timing for the first component carrier corresponds to a second sTTI configured for a second component carrier associated with uplink transmissions, and wherein the second sTTI is shorter than the first TTI or sTTI;

means for receiving a downlink transmission over the first component carrier using the first TTI or sTTI; and means for transmitting a downlink HARQ positive or negative acknowledgment (ACK/NACK) message corresponding to the downlink transmission according to the identified HARQ timing.

32. An apparatus for wireless communication, comprising:

means for configuring a first component carrier with a first transmission time interval (TTI) or shortened TTI (sTTI) for downlink transmissions and a second component carrier with a second sTTI for uplink transmissions, wherein the second sTTI is shorter than the first TTI or sTTI;

means for identifying a hybrid automatic repeat request (HARQ) timing for the first component carrier and associated with downlink transmissions, wherein the HARQ timing for the first component carrier corresponds to the second sTTI configured for the second component carrier;

means for performing a downlink transmission over the first component carrier using the first TTI or sTTI; and means for receiving a downlink HARQ positive or negative acknowledgment (ACK/NACK) message corresponding to the downlink transmission according to the identified HARQ timing.

33. An apparatus for wireless communication, comprising:

a processor;

memory in electronic communication with the processor; and instructions stored in the memory and executable by the processor to cause the apparatus to:

identify a hybrid automatic repeat request (HARQ) timing for a first component carrier configured with a first transmission time interval (TTI) or shortened TTI (sTTI) and associated with downlink transmissions, wherein the HARQ timing for the first component carrier corresponds to a second sTTI configured for a second component carrier associated with uplink transmissions, and wherein the second sTTI is shorter than the first TTI or sTTI;

receive a downlink transmission over the first component carrier using the first TTI or sTTI; and transmit a downlink HARQ positive or negative acknowledgment (ACK/NACK) message corresponding to the downlink transmission according to the identified HARQ timing.

34. The apparatus of claim 33, wherein the instructions to identify the HARQ timing for the first component carrier are executable by the processor to cause the apparatus to:

receive an indication of the HARQ timing over the first component carrier.

35. The apparatus of claim 33, wherein the instructions are further executable by the processor to cause the apparatus to:

transmit an indication of one or more user equipment (UE) capabilities, wherein the HARQ timing is further based at least in part on the one or more UE capabilities.

36. The apparatus of claim 35, wherein the one or more UE capabilities comprise a transport block size (TBS), a number of layers, a reference signal type, a physical downlink control channel (PDCCH) transmission duration, an sTTI PDCCH transmission duration, a number of blind decodes, a search space size for the PDCCH or the sTTI PDCCH, or a combination thereof.

37. The apparatus of claim 35, wherein the one or more UE capabilities correspond to a UE transmitting the downlink HARQ ACK/NACK message, the instructions further executable by the processor to cause the apparatus to:

determine a number of component carriers configured with the first TTI or sTTI, a total number of component carriers configured for the UE, or a combination thereof, wherein the indication of the one or more UE capabilities is based at least in part on the number of component carriers configured with the first TTI or sTTI, the total number of component carriers configured for the UE, or the combination thereof.

38. The apparatus of claim 35, wherein the instructions are further executable by the processor to cause the apparatus to:

determine a maximum timing advance (TA) based at least in part on the second sTTI, the one or more UE capabilities, or a combination thereof.

39. The apparatus of claim 33, wherein the downlink HARQ ACK/NACK message is transmitted over the second component carrier using the second sTTI.

40. The apparatus of claim 33, wherein the first component carrier and the second component carrier correspond to a same PUCCH group.

41. The apparatus of claim 33, wherein the first component carrier is configured in a time division duplex (TDD) mode, a licensed assisted access (LAA) mode, an enhanced LAA (eLAA) mode, or a combination thereof.

42. The apparatus of claim 33, wherein the first component carrier or the second component carrier is configured in a frequency division duplex (FDD) mode.

43. The apparatus of claim 33, wherein the first TTI or sTTI comprises an sTTI spanning seven orthogonal frequency division multiplexing (OFDM) symbols.

44. The apparatus of claim 33, wherein the first TTI or sTTI comprises a TTI spanning fourteen orthogonal frequency division multiplexing (OFDM) symbols.

45. The apparatus of claim 44, wherein the TTI is split into two slots, and the downlink transmission is received over each of the two slots.

46. The apparatus of claim 33, wherein the second sTTI spans two or three orthogonal frequency division multiplexing (OFDM) symbols.

47. The apparatus of claim 33, wherein:

the first component carrier comprises a secondary cell (SCell) component carrier; and the second component carrier comprises a primary cell (PCell) component carrier or a physical uplink control channel SCell (PSCell) component carrier.

48. An apparatus for wireless communication, comprising:

a processor;

memory in electronic communication with the processor; and instructions stored in the memory and executable by the processor to cause the apparatus to:

configure a first component carrier with a first transmission time interval (TTI) or shortened TTI (sTTI) for downlink transmissions and a second component carrier with a second sTTI for uplink transmissions, wherein the second sTTI is shorter than the first TTI or sTTI;

identify a hybrid automatic repeat request (HARQ) timing for the first component carrier and associated with downlink transmissions, wherein the HARQ timing for the first component carrier corresponds to the second sTTI configured for the second component carrier;

perform a downlink transmission over the first component carrier using the first TTI or sTTI; and receive a downlink HARQ positive or negative acknowledgment (ACK/NACK) message corresponding to the downlink transmission according to the identified HARQ timing.

49. The apparatus of claim 48, wherein the instructions are further executable by the processor to cause the apparatus to:

transmit an indication of the HARQ timing over the first component carrier.

50. The apparatus of claim 48, wherein the instructions are further executable by the processor to cause the apparatus to:

identify one or more user equipment (UE) capabilities, wherein identifying the HARQ timing is further based at least in part on the one or more UE capabilities.

51. The apparatus of claim 50, wherein the one or more UE capabilities comprise a transport block size (TBS), a number of layers, a reference signal type, a physical downlink control channel (PDCCH) transmission duration, an sTTI PDCCH transmission duration, a number of blind decodes, a search space size for the PDCCH or the sTTI PDCCH, or a combination thereof.

52. The apparatus of claim 50, wherein:

the one or more UE capabilities correspond to a UE transmitting the downlink HARQ ACK/NACK message; and the one or more UE capabilities are based at least in part on a number of component carriers configured with the first TTI or sTTI, a total number of component carriers configured for the UE, or a combination thereof.

53. The apparatus of claim 50, wherein the instructions to identify the one or more UE capabilities are executable by the processor to cause the apparatus to:

receive an indication of the one or more UE capabilities.

54. The apparatus of claim 48, wherein the downlink HARQ ACK/NACK message is received over the second component carrier using the second sTTI.

55. The apparatus of claim 48, wherein the first component carrier and the second component carrier correspond to a same PUCCH group.

56. The apparatus of claim 48, wherein the instructions are further executable by the processor to cause the apparatus to:

configure the first component carrier in a time division duplex (TDD) mode, a licensed assisted access (LAA) mode, an enhanced LAA (eLAA) mode, or a combination thereof.

57. The apparatus of claim 48, wherein the instructions are further executable by the processor to cause the apparatus to:

configure the first component carrier or the second component carrier in a frequency division duplex (FDD) mode.

58. The apparatus of claim 48, wherein the first TTI or sTTI comprises an sTTI spanning seven orthogonal frequency division multiplexing (OFDM) symbols.

59. The apparatus of claim 48, wherein the first TTI or sTTI comprises a TTI spanning fourteen orthogonal frequency division multiplexing (OFDM) symbols.

60. The apparatus of claim 59, wherein the instructions are further executable by the processor to cause the apparatus to:

split the TTI into two slots, wherein the downlink transmission is performed over each of the two slots.

61. The apparatus of claim 48, wherein the second sTTI spans two or three orthogonal frequency division multiplexing (OFDM) symbols.

62. The apparatus of claim 48, wherein:

the first component carrier comprises a secondary cell (SCell) component carrier; and the second component carrier comprises a primary cell (PCell) component carrier or a physical uplink control channel SCell (PSCell) component carrier.

63. A non-transitory computer-readable medium storing code for wireless communication, the code comprising instructions executable by a processor to:

identify a hybrid automatic repeat request (HARQ) timing for a first component carrier configured with a first transmission time interval (TTI) or shortened TTI (sTTI) and associated with downlink transmissions, wherein the HARQ timing for the first component carrier corresponds to a second sTTI configured for a second component carrier associated with uplink transmissions, and wherein the second sTTI is shorter than the first TTI or sTTI;

receive a downlink transmission over the first component carrier using the first TTI or sTTI; and transmit a downlink HARQ positive or negative acknowledgment (ACK/NACK) message corresponding to the downlink transmission according to the identified HARQ timing.

64. A non-transitory computer-readable medium storing code for wireless communication, the code comprising instructions executable by a processor to:

configure a first component carrier with a first transmission time interval (TTI) or shortened TTI (sTTI) for downlink transmissions and a second component carrier with a second sTTI for uplink transmissions, wherein the second sTTI is shorter than the first TTI or sTTI;

identify a hybrid automatic repeat request (HARQ) timing for the first component carrier and associated with downlink transmissions, wherein the HARQ timing for the first component carrier corresponds to the second sTTI configured for the second component carrier;

perform a downlink transmission over the first component carrier using the first TTI or sTTI; and receive a downlink HARQ positive or negative acknowledgment (ACK/NACK) message corresponding to the downlink transmission according to the identified HARQ timing.

* * * * *